(12) United States Patent
Gao et al.

(10) Patent No.: US 7,842,627 B2
(45) Date of Patent: Nov. 30, 2010

(54) OLEFIN BLOCK COMPOSITIONS FOR STRETCH FABRICS WITH WRINKLE RESISTANCE

(75) Inventors: Tong Gao, Singapore (SG); Hongyu Chen, Lake Jackson, TX (US); Alberto Lora Lamia, Trivero (IT); Yuen-Yuen D. Chiu, Pearland, TX (US); Jerry Chien Ting Wang, Taichung (TW); Shih-Yaw Lai, Pearland, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 11/948,669

(22) Filed: Nov. 30, 2007

(65) Prior Publication Data
US 2008/0138599 A1 Jun. 12, 2008

Related U.S. Application Data

(60) Provisional application No. 60/868,020, filed on Nov. 30, 2006.

(51) Int. Cl.
*D03D 15/08* (2006.01)
*D04B 1/18* (2006.01)

(52) U.S. Cl. .................. 442/182; 442/306; 442/211; 442/212; 442/199; 442/311; 526/89; 526/346

(58) Field of Classification Search .......... 442/182, 442/199, 211–212, 306, 311
See application file for complete search history.

(56) References Cited

U.S. PATENT DOCUMENTS

| | | | |
|---|---|---|---|
| 2,973,344 A | 2/1961 | Fasce | |
| 2,997,432 A | 8/1961 | Koble et al. | |
| 4,146,492 A | 3/1979 | Cusano et al. | |
| 4,299,931 A | 11/1981 | Coran et al. | |
| 4,322,027 A | 3/1982 | Reba | |
| 4,340,563 A | 7/1982 | Appel et al. | |
| 4,413,110 A | 11/1983 | Kavesh et al. | |
| 4,429,079 A | 1/1984 | Shibata et al. | |
| 4,510,031 A | 4/1985 | Matsumura et al. | |
| 4,663,220 A | 5/1987 | Wisneski et al. | |
| 4,668,566 A | 5/1987 | Braun | |
| 4,762,890 A | 8/1988 | Strait et al. | |
| 4,780,228 A | 10/1988 | Gardiner et al. | |

(Continued)

FOREIGN PATENT DOCUMENTS

EP 0 877 050 11/1998

(Continued)

OTHER PUBLICATIONS

Markovich et al. "Development of gel-permeation chromatography-Fourier transform infrared spectroscopy for characterization of ethylene-based polyolefin copolymers". 65 Pol. Mater. Sci. and Eng. (1991), pp. 98-100.

(Continued)

*Primary Examiner*—Lynda Salvatore
(74) *Attorney, Agent, or Firm*—Whyte Hirschboeck Dudek SC

(57) ABSTRACT

Compositions having good wrinkle resistance and other properties when made into garments an be made from an ethylene multi-block copolymers. The resulting fabrics and garments often have good chemical resistance, heat-resistances, and are dimensionally stable.

25 Claims, 8 Drawing Sheets

U.S. PATENT DOCUMENTS

| | | | |
|---|---|---|---|
| 4,798,081 A | 1/1989 | Hazlitt et al. |
| 4,927,888 A | 5/1990 | Strait et al. |
| 4,950,541 A | 8/1990 | Tabor et al. |
| 5,068,047 A | 11/1991 | Chung et al. |
| 5,266,626 A | 11/1993 | Hert et al. |
| 5,300,240 A | 4/1994 | Wilhelm et al. |
| 5,322,728 A | 6/1994 | Davey et al. |
| 5,391,629 A | 2/1995 | Turner et al. |
| 5,597,881 A | 1/1997 | Winter et al. |
| 5,624,991 A | 4/1997 | Harada et al. |
| 5,783,531 A | 7/1998 | Andrew et al. |
| 5,868,984 A | 2/1999 | Winter et al. |
| 5,892,076 A | 4/1999 | Nickias |
| 5,916,953 A | 6/1999 | Jacoby et al. |
| 5,994,255 A | 11/1999 | Nickias et al. |
| 6,008,262 A | 12/1999 | McKay et al. |
| 6,025,448 A | 2/2000 | Swindoll et al. |
| 6,030,917 A | 2/2000 | Weinberg et al. |
| 6,096,668 A | 8/2000 | Abuto et al. |
| 6,121,402 A | 9/2000 | Machida et al. |
| 6,136,937 A | 10/2000 | Lai et al. |
| 6,147,180 A | 11/2000 | Markel et al. |
| 6,160,029 A | 12/2000 | Chaudhary et al. |
| 6,187,424 B1 | 2/2001 | Kjellqvist et al. |
| 6,197,404 B1 | 3/2001 | Varona |
| 6,248,540 B1 | 6/2001 | Weinberg et al. |
| 6,268,444 B1 | 7/2001 | Klosin et al. |
| 6,306,658 B1 | 10/2001 | Turner et al. |
| 6,316,663 B1 | 11/2001 | Guram et al. |
| 6,362,252 B1 | 3/2002 | Prutkin |
| 6,362,309 B1 | 3/2002 | Lund et al. |
| 6,437,014 B1 | 8/2002 | Ho et al. |
| 6,455,638 B2 | 9/2002 | Laughner et al. |
| 6,537,472 B2 | 3/2003 | Masubichi |
| 6,566,446 B1 | 5/2003 | Parikh et al. |
| 6,585,780 B2 | 7/2003 | Koola et al. |
| 6,667,351 B2 | 12/2003 | Langohr et al. |
| 6,803,014 B2 | 10/2004 | Ho et al. |
| 6,815,023 B1 | 11/2004 | Tatarka et al. |
| 7,005,395 B2 | 2/2006 | Zafiroglu et al. |
| 7,355,089 B2 | 4/2008 | Chang et al. |
| 7,524,911 B2 | 4/2008 | Karjala et al. |
| 7,504,347 B2 | 3/2009 | Poon et al. |
| 7,514,517 B2 | 4/2009 | Hoenig et al. |
| 2003/0004286 A1 | 1/2003 | Klosin et al. |
| 2003/0027954 A1 | 2/2003 | Becke et al. |
| 2003/0111633 A1 | 6/2003 | Gardner et al. |
| 2003/0195128 A1 | 10/2003 | Deckman et al. |
| 2003/0204017 A1 | 10/2003 | Stevens et al. |
| 2003/0216518 A1 | 11/2003 | Tau et al. |
| 2004/0010103 A1 | 1/2004 | Boussie et al. |
| 2004/0082750 A1 | 4/2004 | Tau et al. |
| 2004/0092662 A1 | 5/2004 | Goto |
| 2004/0158011 A1 | 8/2004 | Jain et al. |
| 2004/0192147 A1 | 9/2004 | Smith et al. |
| 2005/0009993 A1 | 1/2005 | Morioka et al. |
| 2006/0030667 A1* | 2/2006 | Yalvac et al. ............... 525/191 |
| 2006/0198983 A1 | 9/2006 | Patel et al. |
| 2006/0199744 A1 | 9/2006 | Walton et al. |
| 2006/0199872 A1 | 9/2006 | Prieto et al. |
| 2006/0199887 A1 | 9/2006 | Liang et al. |
| 2006/0199896 A1 | 9/2006 | Walton et al. |
| 2006/0199905 A1 | 9/2006 | Hughes et al. |
| 2006/0199906 A1 | 9/2006 | Walton et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Shan et al. |
| 2006/0199931 A1* | 9/2006 | Poon et al. ............... 526/346 |
| 2006/0205833 A1 | 9/2006 | Martinez et al. |
| 2006/0211819 A1 | 9/2006 | Hoenig et al. |
| 2007/0010616 A1 | 1/2007 | Kapur et al. |
| 2007/0078222 A1 | 4/2007 | Chang et al. |
| 2007/0155900 A1 | 7/2007 | Chang et al. |
| 2008/0299857 A1 | 12/2008 | Harding et al. |

FOREIGN PATENT DOCUMENTS

| | | |
|---|---|---|
| EP | 1 026 184 | 8/2000 |
| EP | 1 262 498 A2 | 12/2002 |
| JP | 2004-204058 | 7/2004 |
| WO | WO 89/12714 | 12/1989 |
| WO | WO 98/30387 * | 7/1998 ............ 23/8 |
| WO | WO 02/079322 | 10/2002 |
| WO | WO 03/040195 | 5/2003 |
| WO | WO 2004/024740 | 3/2004 |
| WO | WO 2005/090425 | 9/2005 |
| WO | WO 2005/090426 | 9/2005 |
| WO | WO 2005/090426 A1 | 9/2005 |
| WO | WO 2005/090427 | 9/2005 |
| WO | WO 2006/012081 A | 2/2006 |
| WO | WO 2006/101968 A | 9/2006 |

OTHER PUBLICATIONS

Deslauriers et al.; "Quantifying short chain branching microstructures in ethylene-1-olefin copolymers using size exclusion chromatography and Fourier transform infrared spectroscopy (SEC-FTIR)", 43 Polymer (2002), pp. 59-170.

Williams et al., The Construction of a Polyethylene Calibration Curve for Gel permeation Chromotography Using Polystyr, 6 J. Polym. Sci., Polym. Let., (1968), pp. 621-624.

Wilde et al., "Determination of Branching Distributions in Polyethylene and Ethylene Copolymers" 20 J. Polym. Sci., (1982), pp. 441-455.

Randall, "A Review of High Resolution Liquid 13 Carbon Nuclear Magnetic Resonance Characterizations . . . " C29 (2&3) JMS-Rev. Macromol. Chem. Phys. (1989), pp. 201-317.

U.S. Appl. No. 60/662,937, filed Mar. 17, 2005.
U.S. Appl. No. 60/662,938, filed Mar. 17, 2005.
U.S. Appl. No. 60/662,939, filed Mar. 17, 2005.
International Search Report (PCT/US20071086097), dated Sep. 17, 2008.

* cited by examiner

OLEFIN BLOCK COMPOSITIONS FOR STRETCH FABRICS WITH WRINKLE RESISTANCE

CROSS-REFERENCE TO RELATED APPLICATIONS

For purposes of United States patent practice, the contents of U.S. Provisional Application No. 60/868,020 filed on Nov. 30, 2006, PCT Application No. PCT/US2005/008917 (Dow 63558D), filed on Mar. 17, 2005, which in turn claims priority to U.S. Provisional Application No. 60/553,906, filed Mar. 17, 2004 are herein incorporated by reference in their entirety.

FIELD OF THE INVENTION

This invention relates to improved compositions for stretch fabrics with wrinkle resistance.

BACKGROUND OF THE INVENTION

As textile articles such as fabric, linens and garments are used, wrinkles appear on the surface. In the case of garments, particularly cellulosic-based garments, wear and especially the laundering of the garments causes wrinkles which results in a generally undesirable appearance. To remove the wrinkles, consumers of the garment use a variety of methods including ironing, pressing and even closely monitored tumble drying. Frequent or difficult wrinkling leads to consumer dissatisfaction. Manufacturers and designers of textile articles have sought to give the articles a durable press such that the articles exhibit the ability to avoid wrinkle formation and/or the ability to quickly remove the wrinkles with minimal effort.

Typical wrinkle-free treatments (also sometimes referred to as a durable press coating) include imparting hydrogen or covalent bonds that do not significantly degrade when the fabric is cleaned in some fashion, typically by hand or machine washing. In this sense the bonds are permanent and the fabric is relatively wrinkle-free during its useful life. Typical durable press coatings often involve the application of a chemical coating to the surface of the fabric, i.e., textile. These coatings usually include a cross-linking agent and catalyst such that cross-links form between the agent and a material, e.g. cellulose, in the fibers. The crosslinks not only provide wrinkle resistance but may also improve dimensional stability, increase fabric smoothness and improve crease retention.

The chemical coatings which are often currently used to impart wrinkle resistance to a textile, are relatively harsh and unsuitable for many fabrics. There is a continuing need for stretchable fabric that is capable of being subjected to wrinkle-free treatment.

SUMMARY OF THE INVENTION

Provided herein are textile articles comprising stretchable fabrics that have a combination of desirable properties including one or more of the following: dimensional stability, heat-set properties, capability to be made wrinkle-free, stretchable in one or both dimensions, capability to be made into garments that retain creases, chemical, heat, and abrasion resistant, tenacity, etc. In one aspect, such fabrics are able to withstand hand or machine washing without significantly degrading one or more of the aforementioned properties.

Stretchable fabric or stretch fabric compositions provided herein have a balanced combination of desirable properties.

The fabric provided herein is typically a stretch fabric capable of being subjected to a wrinkle-free treatment. The stretch fabric provided herein comprises:

(A) an ethylene/α-olefin interpolymer, wherein the ethylene/α-olefin interpolymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using, TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{ or}$$

(4) an Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 } \mu\text{J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

Re>1481−1629(d); or (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomers(s) and has a melt index, density, and molar comonomer content (based on the whole polymer) within 10 percent of that of the ethylene/α-olefin interpolymer; or (7) a storage modulus at 25° C. G'(25° C.), and a storage modulus at 100° C., G'(100° C.), wherein the ratio of G'(25° C.) to G'(100° C.) is in the range of about 1:1 to about 9:1, and (B) at least one other material;

wherein the fabric has a stretch of at least 8 percent measured according to ASTM D3107 and wherein the fabric has a durable press rating of at least 3.0 after 5 times washing using AATCC-124 or Marks and Spencer P134 after said fabric is subjected to a wrinkle-free treatment.

The ethylene/α-olefin interpolymer characteristics (1) through (7) above are given with respect to the ethylene/α-olefin interpolymer before any significant crosslinking, i.e., before crosslinking. The ethylene/α-olefin interpolymers useful in the present invention may or may not be crosslinked depending upon the desired properties. By using characteristics (1) through (7) as measured before crosslinking is not meant to suggest that the interpolymer is required or not required to be crosslinked only that the characteristic is measured with respect to the interpolymer without significant crosslinking. Crosslinking may or may not change each of these properties depending upon the specific polymer and degree of crosslinking.

In certain embodiments, the ethylene/α-olefin interpolymer in the stretch fabric provided herein is in form of an elastic fiber.

The other material is often selected from the group consisting of cotton, flax, ramie, rayon, viscose, hemp, wool, silk, linen, bamboo, tencel, viscose, mohair, polyester, polyamide, polypropylene, other cellulosic, protein, or synthetic fibers, as well as, mixtures thereof. In one embodiment, the other material comprises cellulose, wool, or mixtures thereof. In one embodiment the fabric is knitted or woven.

DETAILED DESCRIPTION OF THE INVENTION

General Definitions

Figure 1:
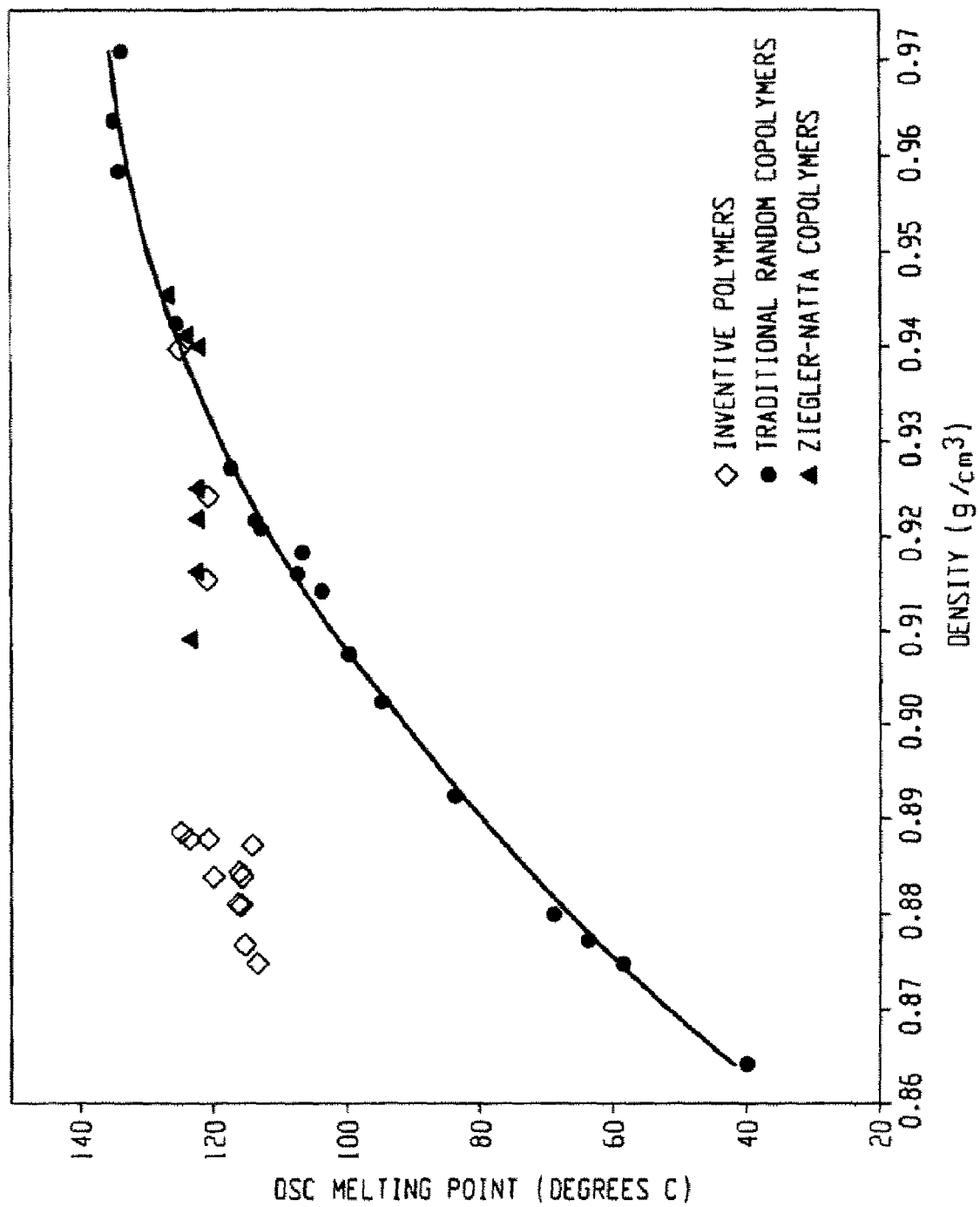
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/b-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms interpolymer and copolymers are used interchangeably herein. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block.

In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376, 835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-reularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

(A) Ethylene/α-olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 - 13141(d) - 6720.3(d)^2, \text{ and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C.

when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
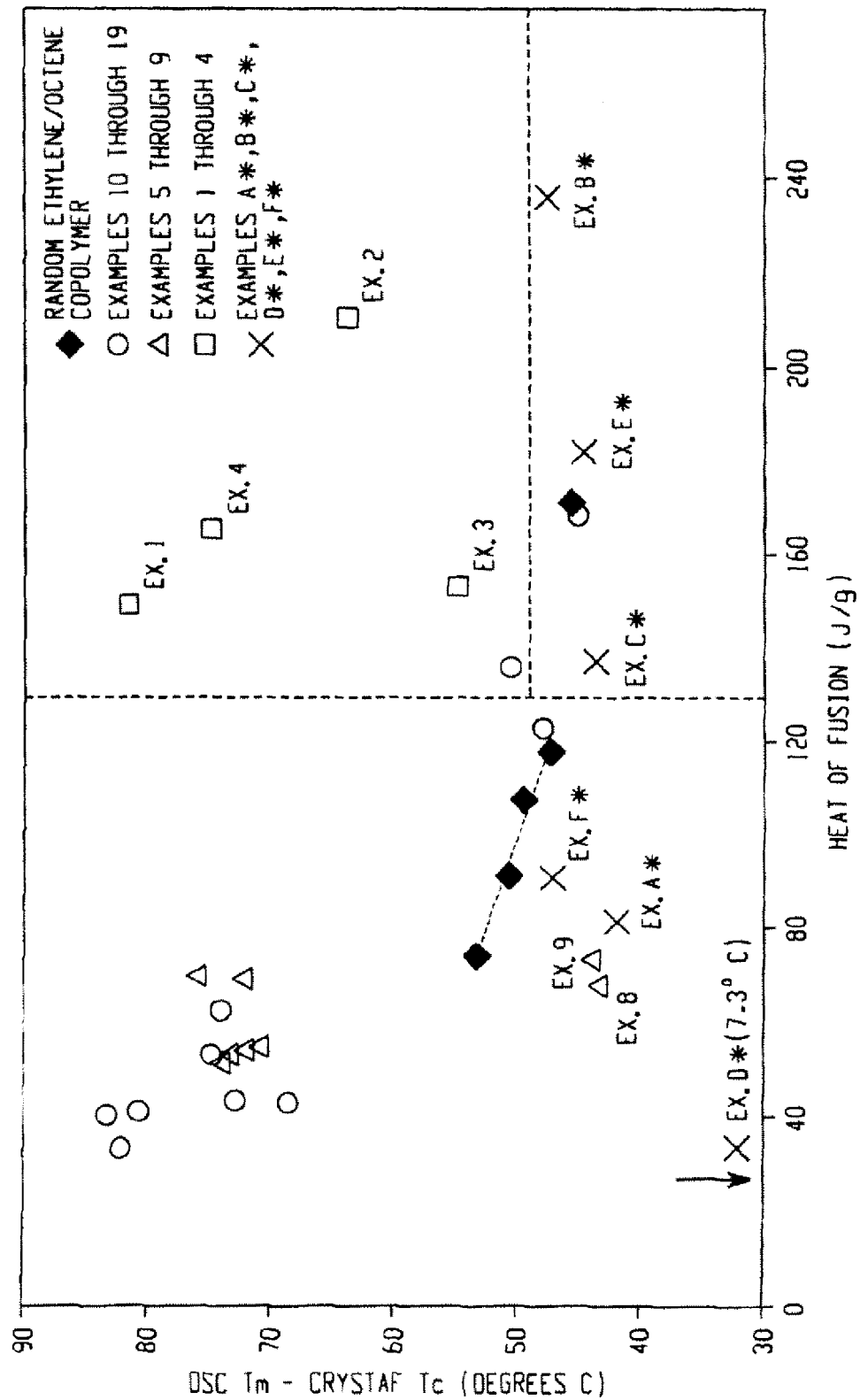
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C. and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

Re>1481−1629(d); and preferably
Re>1491−1629(d); and more preferably
Re>1501−1629(d); and even more preferably
Re≧1511−1629(d).

Figure 3:
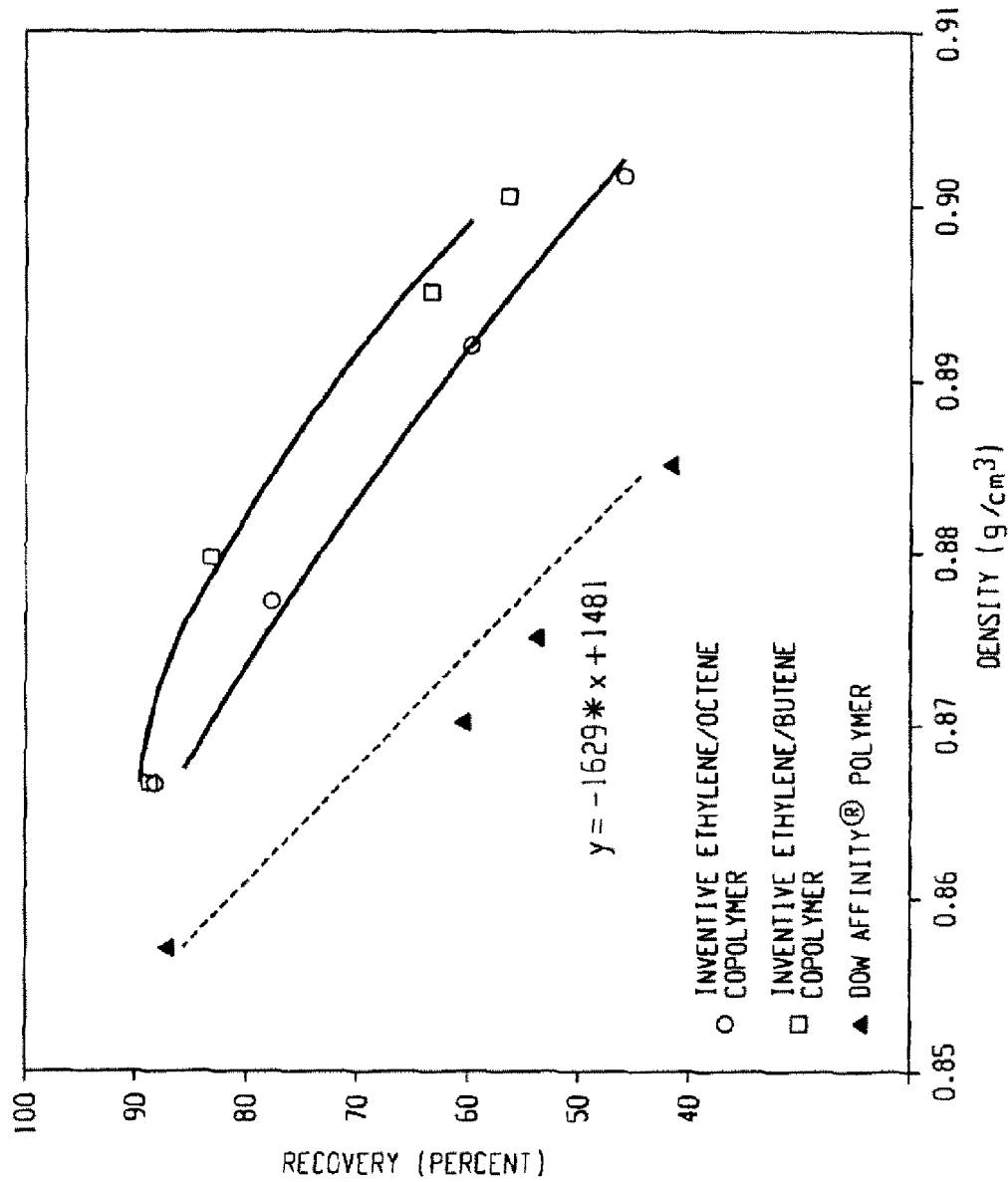
FIG. 3 shows the effect of density on elastic recovery for unoriented films made from inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recover for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength ≧11 MPa, more preferably a tensile strength ≧13 MPa, and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 µJ/g and or a pellet blocking strength of equal to or less than 100 pounds/foot$^2$ (4800 Pa), preferably equal to or less than 50 lbs/ft$^2$ (2400 Pa), especially equal to or less than 5 lbs/ft (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREE peak of the inventive polymer can be determined by referencing this calibration curve using its FWHM methyl: methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
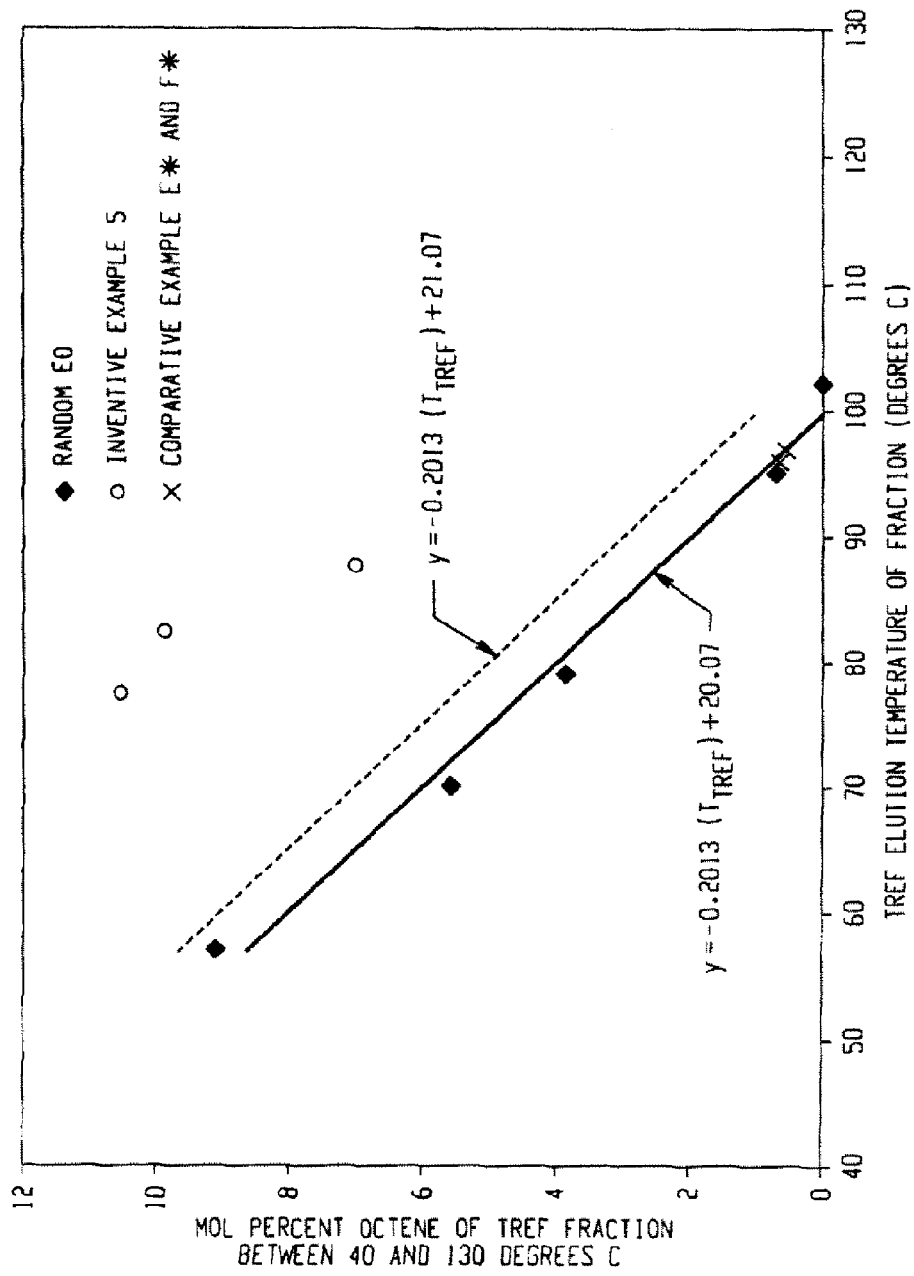
FIG. 4 is a plot of octene content of TREF fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/ 1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
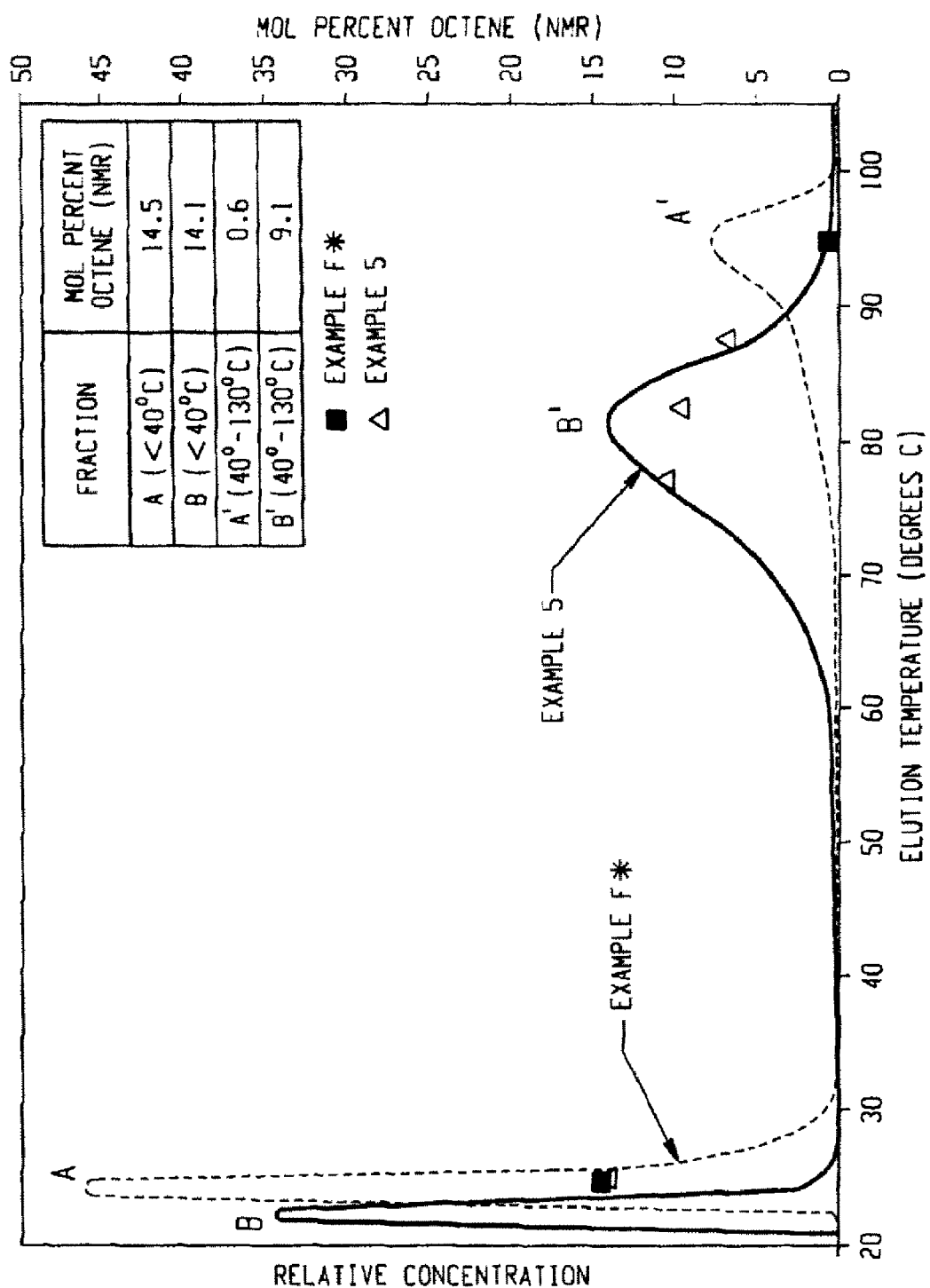
FIG. 5 is a plot of octene content of TREE fractionated ethylene 1-octene copolymer fractions versus TREF elution temperature of the fraction for the polymer of Example 5 (curve 1) and for comparative F (curve 2). The squares represent Example F*; and the triangles represent Example 5.

FIG. 5 graphically displays the TREF curve and comonomer contents of polymer fractions for Example 5 and comparative F discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREE elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$ and more especially for polymers having more than about 1 mole percent comonomer, the blocked interpolymer has a comonomer content of the TREF fraction eluting between 40 and 113° C. greater than or equal to the quantity (−0.1356) T+13.89 more preferably greater than or equal to the quantity (−0.1356) T+14.93, and most preferably greater than or equal to the quantity (−0.2013) T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C.

For those fractions having a comonomer content from about 3 mole percent to about 6 mole percent, every fraction has a DSC melting point of about 110° C. or higher. More preferably, said polymer fractions, having at least 1 mole percent comonomer, has a DSC melting point that corresponds to the equation:

$$T_m \geq (-5.5926)(\text{mole percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(\text{ATREF elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(\text{ATREF elution temperature in (Celsius)} + 22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C. with an increment of 5° C.;

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value);

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$\text{Ln }\beta = -237.83/T_{ATREF} + 0.639$$

$T_{XO}$ is the ATREF temperature for a random copolymer of the same composition and having an ethylene mole fraction of $P_X$. $T_{XO}$ can be calculated from $\text{Ln}P_X = \alpha/T_{XO} + \beta$. Conversely, $P_{XO}$ is the ethylene mole fraction for a random copolymer of the same composition and having an ATREF temperature of $T_X$, which can be calculated from $\text{Ln }P_{XO} = \alpha T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments. ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and or (5) one and only one $T_m$.

Figure 6:
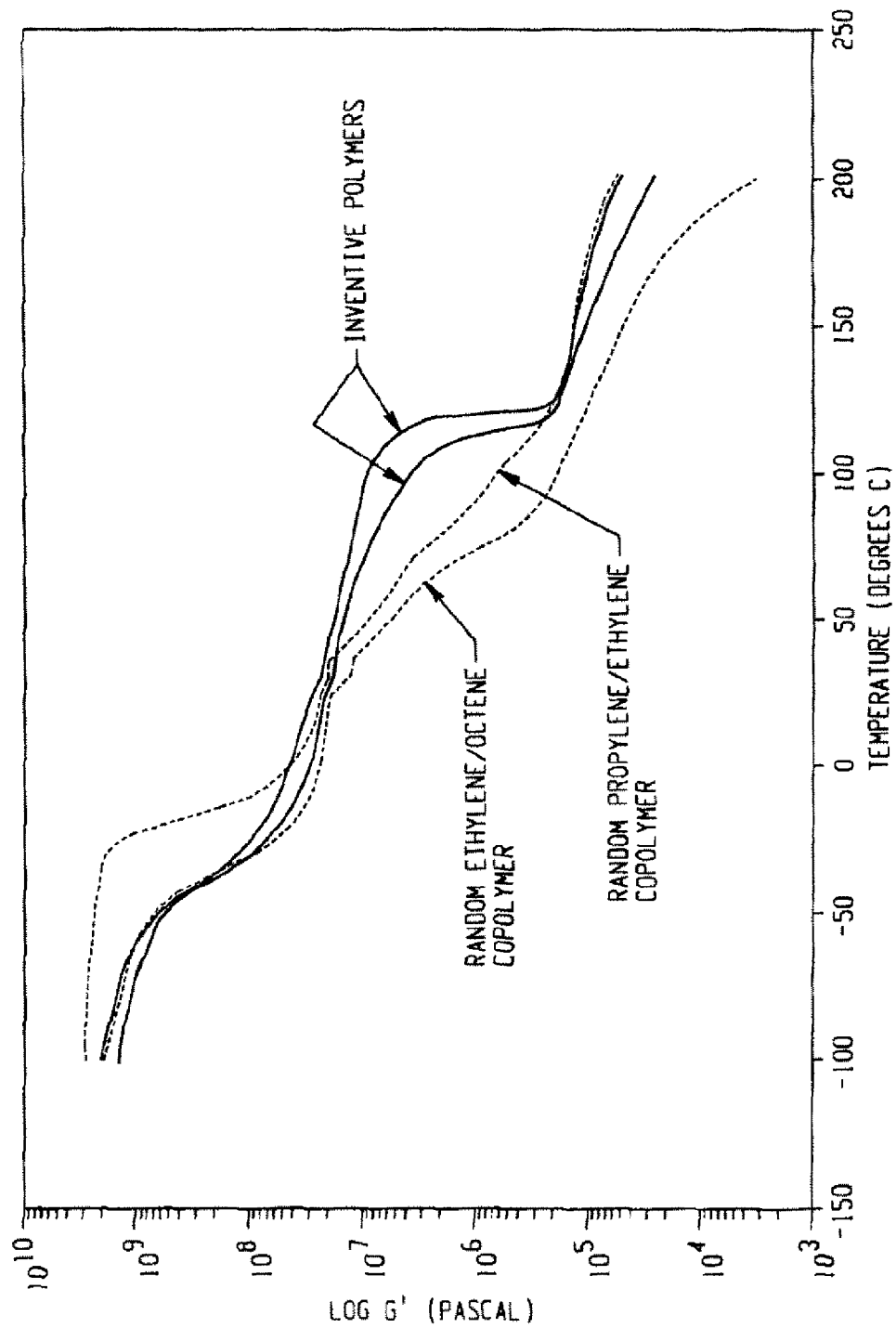
FIG. 6 is a graph of the log of storage modulus as a function of temperature for comparative ethylene/1-octene copolymer (curve 2) and propylene/ethylene-copolymer (curve 3) and for two ethylene 1-octene block copolymers of the invention made with differing quantities of chain shuttling agent (curves 1).

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
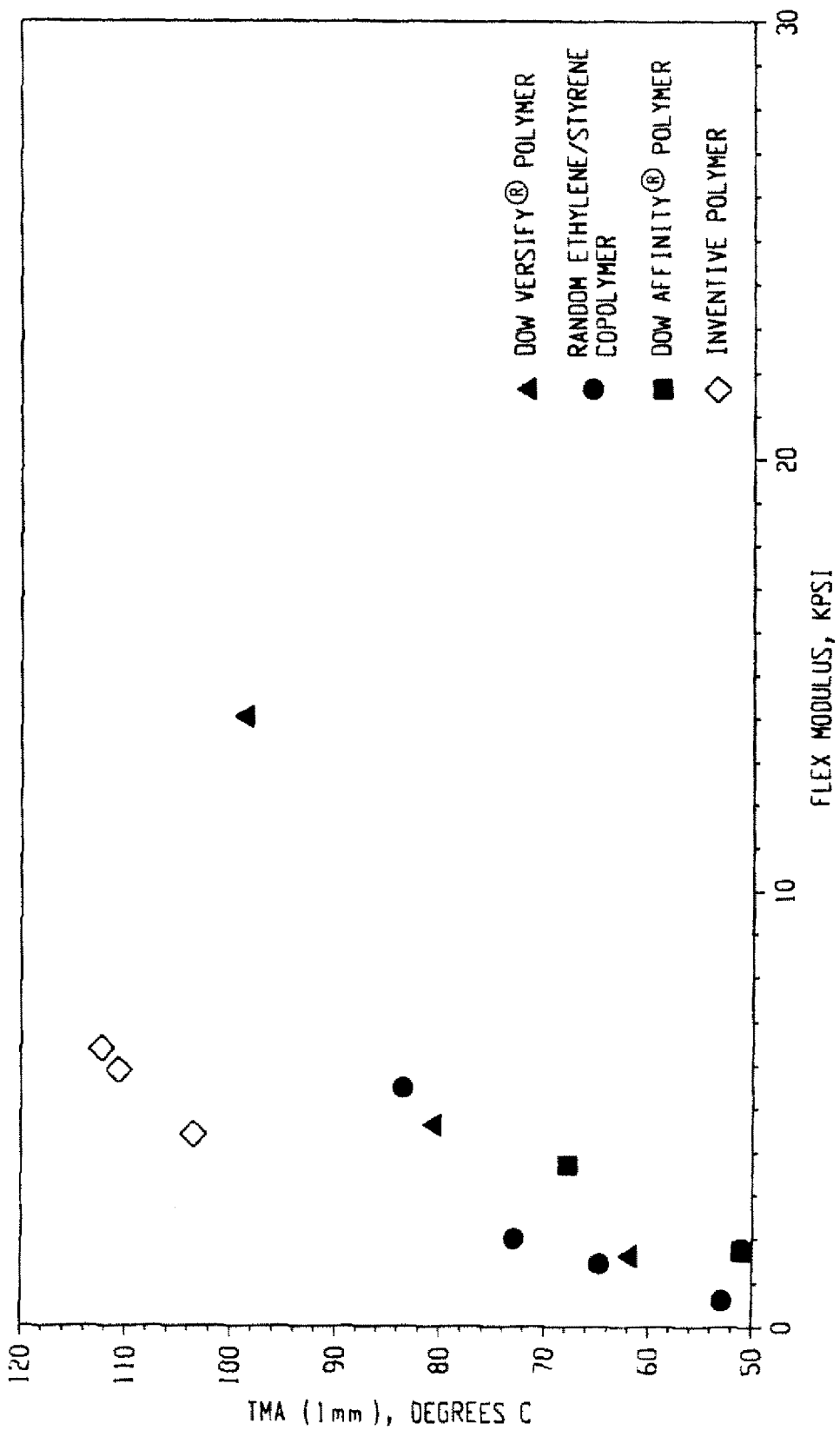
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 5100,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.970 cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005: U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03740195, 2003US0204017. U.S. Ser. No. 10/429,024 fled May 2, 2003, and WO 04/24740.

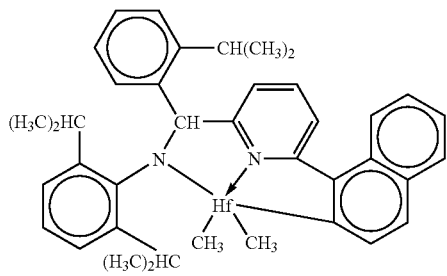

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

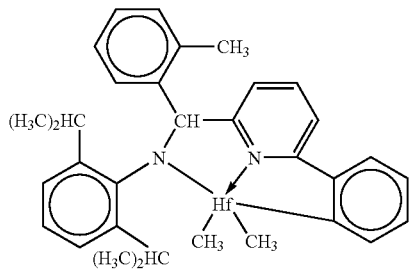

Catalyst (A3) is bis[N,N'''-(2,4,6-tri(methylphenyl)amido) ethylenediamine]hafnium dibenzyl.

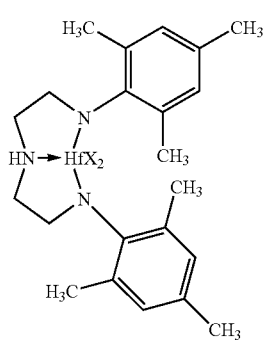

X = CH$_2$C$_6$H$_5$

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

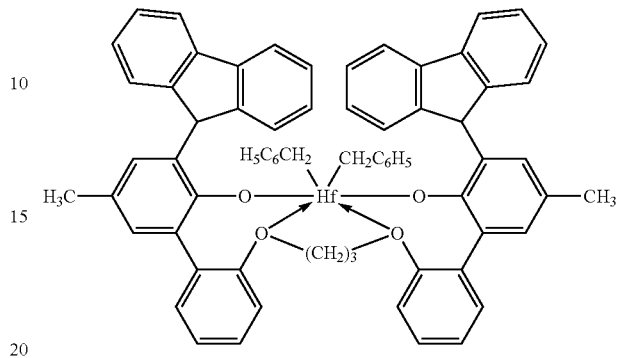

Catalyst (B1) is 1,2-bis-(3,5-di-t-butylphenylene)(1-(N-(1-methylethyl)immino)methyl) (2-oxoyl) zirconium dibenzyl

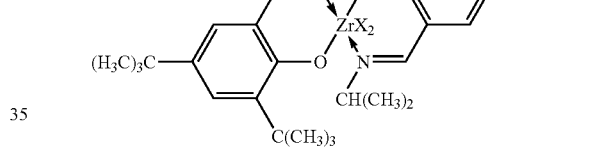

X = CH$_2$C$_6$H$_5$

Catalyst (B2) is 1,2-bis-(3,5-di-t-butylphenylene)(1-(N-(2-methylcyclohexyl)-immino)methyl)(2-oxoyl) zirconium dibenzyl

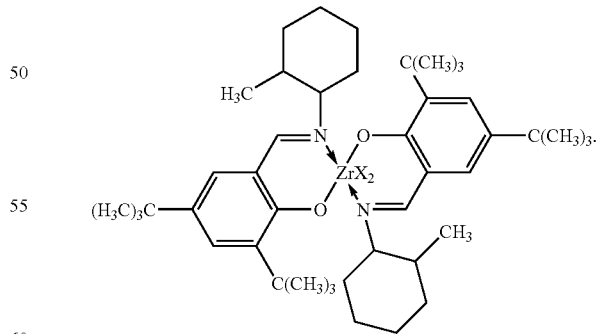

X = CH$_2$C$_6$H$_5$

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

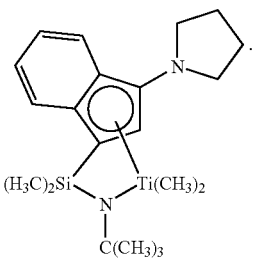

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

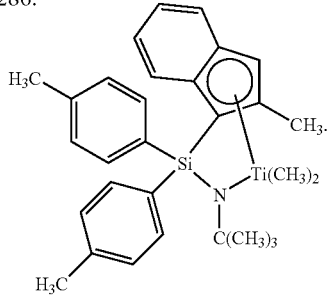

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

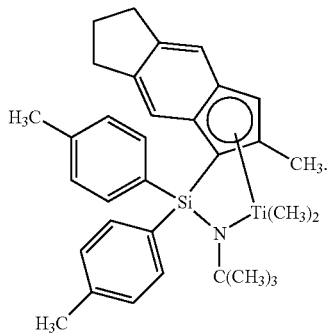

Catalyst (D1) is bis(dimethyldisiloxane) (indene-1-yl)zirconium dichloride available from Sigma-Aldrich:

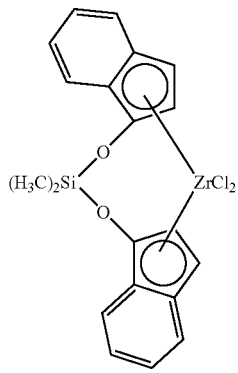

Shuttling Agents The shuttling agents employed include diethylzinc, di-(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide) ethylaluminum di(bis (trimethylsilyl)amide) ethylaluminum bis(2,3,6,7-dibenzo-1-azacycloheptaneamide), n-octylaluminum bis(2,3,6,7-dibenzo-1-azacycloheptaneamide), n-octylaluminum bis (dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/, or lock size of polymer blocks of differing density or comonomer content, which is a Schultz-Flory type of distribution. In addition the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ t-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyelopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2CHR^*$, where $R^*$ is a linear or branched alkyl group of from 1 to 12 carbon atoms Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, ad a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

Elastic Fiber

The amount of ethylene/α-olefin interpolymer in a given fabric depends upon the desired properties, desired applications, and other components of the fabric. In one embodiment, the ethylene/α-olefin interpolymer comprises at least about 2, 3, 4, 5, 6, 7, 8, 9, 10, 12, 14, 16, 18, 20, 23, 24, 26, or 28 up to 30 percent or more by weight of the fabric. The ethylene/α-olefin interpolymer may comprise less than about 30, 28, 26, 24, 22, 20, 18, 16, 14, 12, 10, 9, 8, 7, 6, 5, 4, or 3 weight percent of the fabric. Typically, the ethylene/α-olefin interpolymer is in the form of a fiber having elastic properties and often may comprise from about 1 to about 30, preferably from about 2 to about 10, weight percent of the fabric.

A material is typically characterized as elastic (or as having stretch) if it has a high percent elastic recovery (that is, a low percent permanent set) after application of a biasing force. In certain embodiments, elastic materials are characterized by a combination of three important properties, that is, (i) a low stress or load at strain; (ii) a low percent stress or load relaxation, and (iii) a low percent permanent set. In other words, there should be (i) a low stress or load requirement to stretch the material, (ii) zero or low relaxing of the stress or unloading once the material is stretched, and (iii) complete or high recovery to original dimensions after the stretching, biasing or straining is discontinued.

The fiber used in the articles provided herein typically recovers at least about 40 percent, at least about 50 percent, at least about 60 percent, about 70 percent or more of its stretched length after the first pull and after the fourth to 100 percent strain (double the length). One suitable way to do this test is based on the one found in the International Bureau for Standardization of Manmade Fibers, BISFA 1998, chapter 7, option A. Under such a test, the fiber is placed between grips set 4 inches apart, the grips are then pulled apart at a rate of about 20 inches per minute to a distance of eight inches and then allowed to immediately recover. The percent recovery is then measured.

In certain embodiments, the fiber provided herein further comprises crosslinked homogeneously branched ethylene polymers, such as those described in U.S. Pat. No. 6,437,014, and is generically known as lastol. The amount of such homogeneously branched ethylene polymers differs depending upon the elasticity desired and compatibility with the specific ethylene/α-olefin interpolymer employed.

In certain embodiments, the fiber used herein further comprises other polymers, for example, random ethylene copolymers such as AFFINITY® or ENGAGE®, traditional polyethylenes such as HDPE, LLDPE, ULDPE, LDPE and propylene-based polymers such as homopolymer PP, random copolymer PP or PP-based plastomers/elastomers or a combination thereof. The amount of such other polymers differs depending upon the elasticity desired and compatibility with the specific ethylene/α-olefin interpolymer employed.

If desired an additional stretch material may be employed in addition to the ethylene/α-olefin interpolymer. For example, the ethylene/α-olefin interpolymer fiber may be employed in either the warp or weft direction while the second stretch material is employed in the remaining direction. Suitable additional stretch materials may include elastic fibers comprised of a polymer selected from the group consisting of polybutylene terephthalate, spandex, poly(ethylene terephthalate), poly(trimethylene terephthalate), or mixtures thereof. Such mixtures include bicomponent fibers of poly(ethylene terephthalate)/poly(trimethylene terephthalate) such as, for example, T-400™ fibers. While the elasticity and properties vary depending upon the materials and construction of the fabric, it may be desirable to employ ethylene/α-olefin interpolymer fibers in the warp direction and the additional stretch material in the weft direction.

The fibers may be made into any desirable size and cross-sectional shape depending upon the desired application. For many applications approximately round cross-section is desirable due to its reduced friction. However, other shapes such as a trilobal shape, or a flat (i.e., "ribbon" like) shape can also be employed. Denier is a textile term which is defined as the grams of the fiber per 9000 meters of that fiber's length. Preferred sizes include a denier from at least about 1, preferably at least about 20, preferably at least about 50, to at most about 180, preferably at most about 150, preferably at most about 100 denier, preferably at most about 80 denier. For example, the fiber thickness may range from about 1 to 180 denier, from about 5 to about 160 denier from about 10 to about 150 denier, from about 20 to about 140 denier, from about 30 to about 120 denier, from about 40 to about 100 denier, from about 50 to about 90 denier, or from about 40 to about 70 denier.

In certain embodiments, the ethylene/α-olefin interpolymer is in the form of a fiber having a gel content of from about 10% to about 75% by weight. In certain embodiments, the ethylene/α-olefin interpolymer is in the form of a fiber having a gel content of from about 10%, 30%, 40%, 50%, 60% or about 75% by weight. In certain embodiments, the ethylene/α-olefin interpolymer is in the form of a fiber having a gel content of at least about 10% by weight.

The fiber is usually elastic and usually cross-linked. The fiber comprises the reaction product of ethylene/α-olefin interpolymer and any suitable cross-linking agent, i.e., a cross-linked ethylene/α-olefin interpolymer. As used herein, "cross-linking agent" is any means which cross-links one or more, preferably a majority, of the fibers. Thus, cross-linking agents may be chemical compounds but are not necessarily so. Cross-linking agents as used herein also include electron-beam irradiation, beta irradiation, gamma irradiation, corona irradiation, silanes, peroxides, allyl compounds and UV radiation with or without crosslinking catalyst. U.S. Pat. Nos. 6,803,014 and 6,667,351 disclose electron-beam irradiation methods that cm be used in embodiments of the invention. In some embodiments, the percent of cross-linked polymer is at least 10 percent, preferably at least about 20, more preferably at least about 25 weight percent to about at most 75, preferably at most about 50 percent, as measured by the weight percent of gels formed.

Depending upon the application the fiber may take any suitable form including a staple fiber or binder fiber. Typical examples may include filaments, homofil fiber, a or bicomponent fiber. In the case of a bicomponent fiber it may have a sheath-core structure; a sea-island structure; a side-by-side structure; a matrix-fibril structure; or a segmented pie structure. Advantageously, conventional fiber forming processes may be employed to make the aforementioned fibers. Such processes include those described in for example, U.S. Pat. Nos. 4,340,563; 4,663,220; 4,668,566; 4,322,027; and 4,413,110).

The fibers of the present invention facilitate processing in a number of respects. First, the inventive fibers unwind better from a spool than conventional fibers. Ordinary fibers when in round cross section often fail to provide satisfactory unwinding performance due to their base polymer excessive stress relaxation. This stress relaxation is proportional to the age of the spool and causes filaments located at the very surface of the spool to lose grip on the surface, becoming loose filament strands. Later, when such a spool containing conventional fibers is placed over the rolls of positive feeders, i.e. Memminger-IRO, and starts to rotate to industrial speeds, i.e. 100 to 300 rotations/minute, the loose fibers are thrown to the sides of the spool surface and ultimately fall off the edge of the spool. This failure is known as derails which denotes the tendency of conventional fibers to slip off the shoulder or edge of the package which disrupts the unwinding process and ultimately causes machine stops. The inventive fibers exhibit derailing to a much less significant degree which allows greater throughput.

Other Material

The other material or materials used in the wrinkle free fabric provided herein is often selected from the group consisting of cellulose, cotton, flax, ramie, rayon, viscose, hemp, linen, bamboo, tencel, viscose, mohair, polyester, polyamide, polypropylene, and animal fibers such as wool, silk, or keratin. In addition, mixtures of the aforementioned materials may be employed. Preferred fabrics include those wherein the other material comprises cellulose, wool, or mixtures thereof and wherein the fabric is knitted or woven. If the fabric is going to be subjected to a wrinkle-resistance treatment then it is useful if the other material is capable of withstanding such treatment.

In one embodiment, the textile articles provided herein include cellulosic materials. In one aspect, the cellulosic materials comprise 60 to 98 percent, 65-90 percent or 70-85 percent by weight of the textile article. In one embodiment, the cellulosic materials comprise greater than about 90 percent by weight of the textile article. In certain embodiments, the fabrics comprise cotton. One or more other materials can also be used in the textile articles of the present invention, either one or in combination with cellulosic materials. These other materials include natural fibers such as wool, silk or mohair and synthetic fibers such as polyester, polyamide or polypropylene.

In one embodiment, the elastic fiber in the articles provided herein may be used neat, or it may first be incorporated into a multifilament yarn. In many applications the elastic fiber may be wrapped with a natural fiber, such as cotton.

The selection of non-elastic fibers used in the fabric provided herein may depend on the desired fabric construction and the process used to impart wrinkle resistance to the fabric, so as to ensure that the fibers selected have suitable tenacity. For example, if a lightweight cotton-containing fabric is desired and a relatively harsh chemical treatment will be used to impart sprinkle resistance, then it may be advantageous to use a cotton fiber with higher initial tenacity, such as PIMA cotton so that the fibers in the finished fabric will still have acceptable tenacity.

Properties

As provided herein, an article, e.g., fabric or garment, is considered to be elastic or to be a "stretch", article if the article can be stretched at least five percent in the warp and/or weft direction, at least about 8, 9, 10, 11, 12, 13, 14, 18, 20 up to at least about 25 percent. Some fabrics may be stretched in two directions, i.e., the warp and weft directions. The fabric returns to a value closer to its original dimensions after release of the stretching force as per ASTM D3107-1980. The fabrics provided herein often exhibit a growth to stretch ratio of less than 0.5, preferably less than 0.4, preferably less than 0.35, preferably less than 0.3, preferably less than 0.25, preferably less than 0.2, preferably less than 0.15, preferably less than 0.1, preferably less than 0.05. For example, a fabric which stretches 25 percent and which recovers to a value 5 percent greater than original dimension would have a ratio of 0.2. It should be understood that the amount of stretch and recovery will be a function of the weight of the fabric (that is, lighter weight fabrics such as voile will generally have more stretch and less recovery) and the fabric construction (for example herringbone fabrics are known to have greater stretch). In some instances, the article can be stretched at least 15 percent, and even at least 25 percent, in the warp and/or weft direction. It is also contemplated that in certain embodiments, the articles provided herein will have stretch in more than one direction. It is not necessary that the articles have stretch in more than one direction or that the articles have the same amount of stretch in each direction to be within the scope of this invention.

It is also advantageous that the textile articles provided herein can be rendered wrinkle resistant. Typical wrinkle-free treatments (also sometimes referred to as a durable press coating) include imparting hydrogen or covalent bonds that do not significantly degrade when the fabric is cleaned in some fashion, typically by hand or machine washing. In this sense the bonds are permanent and the fabric is relatively wrinkle-free during its useful life. Typical durable press coatings often involve the application of a chemical coating to the surface of the fabric, i.e., textile. These coatings usually include a cross-linking agent and catalyst such that cross-links form between the agent and a material, e.g. cellulose, in the fibers. The crosslinks not only provide wrinkle resistance but may also improve dimensional stability, increase fabric smoothness and improve crease retention. The chemical coatings which are often currently used to impart wrinkle resistance to a textile, are relatively harsh. The inventive stretch fabrics and garments made of same are often capable of enduring common chemical treatment or heat (curing) treatments used for wrinkle resistance.

Wrinkle resistance in the textile industry can be measured according to AATCC 143-1996 (for garments) or AATCC-124-2001 (for finished fabric) or Marks and Spencer P134. Using this testing protocol, in certain embodiments, the articles provided herein will have a durable press (or DP) rating of at least 3.0 after five washes, at least 3.5 or at least about 4.0. In one embodiment, the DP rating will remain at least 3.0 after 25 or even 50 washes.

In some applications, such as pants, it is desired that the article maintains a crease. This desire to maintain a crease sometimes conflicts with technical solutions used to deter wrinkles. Nevertheless, using the fabrics of the present invention such wrinkle-resistant, creased articles are possible. In one embodiment, textile articles provided herein exhibit a Crease Retention ("CR") rating of at least 3.5, as determined according to the testing protocol set forth in AATCC 143-1996. In one embodiment. AATCC 143-1996 3(IV) A(iii), is used for determining CR. Accordingly, the textile articles of the present invention will have a CR of at least about 2.5, 3.0, 3.5, 4.0, 4.5 or 5.

Methods for Preparing Exemplary Articles

Articles provided herein are not limited by the method of making them. Thus, the articles of the present invention include fabrics which have been, for example, woven (where the elastic fiber can be in the warp direction, the weft direction or both) or knitted.

In one embodiment, the wrinkle free articles provided herein can be generated by:

a) No-iron fabric treatments: The cotton (cotton content of >80%) and ethylene α-olefin interpolymer fiber/cotton yarn is weaved into a particular fabric weaving construction after which the fabric is impregnated with resin blends and followed by moisture cure. After the chemical resin treatment, this fabric is stretchable and wrinkle free, with DP ratings above 3.5 after 5 times of washing and the Crease Retention rating >3.5 after 5 times of washing. The garment, which is made with this fabric, forms the stretchable wrinkle free garment.

b) No-iron garment treatments: The cotton (cotton content of >80%) and ethylene α-olefin interpolymer fiber/cotton yarn is weaved into a particular fabric weaving construction after which the fabric goes through the garment making process. Then the chemical resin is applied on the garment, and the garment is cured tinder certain temperatures and pH values. After the curing process, the above garment is stretchable and wrinkle fee, with DP rating >3.5 after 5 times of washing, and Crease Retention rating >3.5 after 5 times of washing.

This invention can be applied to all kind of chemical resin finishing on cotton and ethylene α-olefin interpolymer blend fabrics (woven or knitted). Standard wrinkle free processes have many ways of producing a wrinkle free garment including selecting the order of processing steps and/or choosing different processing temperatures, chemical resins and pH values. A combination of these conditions can be selected to produce a similar wrinkle free fabric or garment.

One skilled in the art may take the fabrics of the present invention and use conventional techniques to prepare garments and other useful textiles that exhibit desired properties such as wrinkle-resistance or crease retention. In certain embodiments, such processes includes one or more of the following steps: yarn formation, yarn dyeing fabric making, fabric finishing, including wrinkle free treatment. The sequence of steps involved in exemplary processes is as follows:

Route 1 (yarn dyeing): Yarn formation (spinning, steaming, winding)-yarn dyeing (dyeing, extracting, drying)-fabric making (reconing, conditioning, weaving)-fabric finishing (singeing, scouring, mercerizing, wrinkle free treatment (including curing), softening, sanforizing).

Route 2 (piece dyeing): Yarn formation (spinning, streaming (optional for standard elastic fiber), winding)-fabric making (reconing, conditioning, weaving)-fabric finishing (singeing, scouring, mercerizing, fabric dyeing, wrinkle free treatment, softening, sanforizing).

Route 3 (wrinkle free garment) Yarn formation (spinning, steaming, winding)-yarn dyeing (dyeing, extracting, drying)-fabric making (reconing, conditioning, weaving)-fabric finishing (singeing, scouring, mercerizing, softening, sanforizing)-garment making-garment dipping process for wrinkle free treatment.

Route 4. (wrinkle free garment) Yarn formation (spinning, streaming (optional for standard elastic fiber), winding)-fabric making (reconing, conditioning, weaving)-fabric finishing (singeing, scouring, mercerizing, fabric dyeing, softening, sanforizing)-garment making-garment dipping process for wrinkle free treatment.

Any method known to impart wrinkle resistance may be used with the textile articles provided herein. Most commercial wrinkle free treatments use formaldehyde-Based Durable Press Finishing Agents, DMDHEU (dimethyloldihydroxyethyleneurea), modified DMDHEU, Polycarboxylic Acids as Nonformaldehyde Durable Press Finishing Agents since 1990s, BTCA, Modified Citric Acid or Polymers of Maleic Acid.

Typically fabrics are prepared and then a finishing solution containing a cross-linking agent together with a catalyst is applied. The application of the finishing solution can be applied to the fabric or to the finished article, as is known in the art. In general, the crosslinking agent and curing catalyst are applied by immersing the cellulosic material into a bath containing the finishing solution, but other methods such as spraying, are known and can be used to make the textile articles of the present invention. Another method for producing wrinkle-resistant garments involves subjecting a pressed garment in a reaction chamber containing sulphur dioxide, formaldehyde and steam where cross-linking of cellulose occurs in situ. Typical cross-linking agents include formaldehyde, formaldehyde derivatives (including addition products with urea) and carbamate esters. Other cross-linking agents are described in WO 89/12714 (organic polycarboxylic acids), U.S. Pat. No. 5,300,240 (phosphinicosuccinic and/or phosphinicobisuccinic acids); U.S. Pat. No. 6,585,780 (phosphinato-substituted polycarboxylic acids) and US 2003/0111633 A1. These references are hereby incorporated by reference in their entirety.

In one embodiment, an ethylene/α-olefin interpolymer fiber is made and then crosslinked to about 10% to 75% gel for use in the process for preparing an article provided herein. In one embodiment, a core spun yarn is then prepared comprising ethylene α-olefin interpolymer as the core and other "hard" fibers (staple fibers) as the covering. Other hard fibers could include pure cotton, pure silk pure linen, bamboo fiber, tencel, viscose, and their blends, or polyester/cotton blend. In one embodiment, the other fiber is pure cotton or pure silk.

In addition to core spinning (staple), other yarn spinning processes can be used and include, but are not limited to Siro spinning (staple), Single covering (staple or continuous), Double covering (staple or continuous), or Air covering (continues filament). In one embodiment, yarns are core spun or siro spun. Both bistretch and one way stretch (weft stretch) are contemplated herein.

In one embodiment, the yarn count is from Ne 100 to Ne 7 from shirting to bottom weight fabrics, respectively. In another embodiment, the yarn count is from Ne 90 to Ne 7, Ne 80 to Ne 7 or Ne 70 to Ne 7. In one embodiment, the range of yarn count is Ne 50 to Ne 7.

The dyeing is carried out at a temperature range from 60 to 200° C. for about 1-2 hours or more. In certain embodiments, the dyeing is carried out at a temperature of about 60, 80, 100, 120, 140, 160, 180 or 200° C. The fabric can be plain, twill, basket, satin, pinpoint oxford, canvas, broken twill, dobby, corduroy weaved. In certain embodiments, the fabric is plain, twill, basket, satin or pinpoint oxford weaved. In one embodiment, the fabric is knitted.

An exemplary finished fabric has the following properties: Tenacity: 50 lb (shirting), 75 lb. (bottom); Fabric tearing strength: 4.5 lb. (shirting), 5.1 lb (bottom) (measured according to ASTM D3107); Abrasion resistance >1,800 rpm (shirting), 35,000 (bottom); Water absorption time <10 second for both shirting and bottom. Washing shrinkage <3% and Stretch level: 9-20%.

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 mim/min flow rate is used to pump helium-purged 1,2-dichlorobenzene stabilized with 300 ppm Ionol as the mobile phase through three Pigel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400–600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1.2.4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia. Spain). The CRYSTAF peak finding routine identifies a peak temperature as a maximum in the dW, dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ea 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward. *J. Polym. Sci., Polym. Let.* 6, 621 (1968)): $M_{polyethylene} = 0.431 (M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min followed by 1.3 MPa for 3 min, and then 2.6 MPa for 3 min. The film is then cooled in the press with running cold water at 1.3 MPa for 3 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment the sample is allowed to equilibrate for 45 minutes at the test temperature before testing. In the 21° C. 300% strain cyclic experiment, the retractive stress at 150% strain from the first unloading cycle is recorded. Percent recover for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1 N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238. Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall. J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 gm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 167° C. per minute.

Approximately 2000 ml portions of eluant from the preparative TREF column are collected in a 16 station heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature" refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicyladehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-his-(3.5-di-t-butylphenylene) (1-(N-(1-methylethyl)immino)methyl)(2-oxoyl) zirconium dibenzyl A solution of (1-methylethyl)(2-hydroxy-3,5-di(t-butyl) phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcylclohexyl)ethyl)(2-oxoyl-3,5-di(t-butyl)phenyl)imine 2-Methylcyclohexylamine (8.44 ml, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1H$ NMR is consistent with the desired product as a mixture of isomers.

b) Preparation of bis-(1-(2-methylcyclohexyl)ethyl) (2-oxoyl-3,5-di(t-butyl)phenyl) immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783) M.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.). HCl and $Li[B(C_6F_5)_4]$, substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl) zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis (t-butyldimethylsiloxide) (SA 14), ethylaluminum di(bis (trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

Examples 1-4, Comparative A-C

General High Throughput Parallel Polymerization Conditions

Polymerizations are conducted using a high throughput, parallel polymerization reactor (PPR) available from Symyx Technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 μJ/g. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 μJ/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 μJ/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

Examples 5-19

Comparatives D-F, Continuous Solution Polymerization, Catalyst A1/B2+DEZ

Continuous solution polymerizations are carried out in a computer controlled autoclave reactor equipped with an internal stirrer. Purified mixed alkanes solvent (Isopar™ E available from ExxonMobil Chemical Company) ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | C$_8$H$_{16}$ kg/hr | Solv. kg/hr | H$_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [C$_2$H$_4$]/ [DEZ][4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 3

Properties of exemplary polymers

| Ex. | Density (g/cm$^3$) | I$_2$ | I$_{10}$ | I$_{10}$/I$_2$ | Mw (g/mol) | Mn (g/mol) | Mw/Mn | Heat of Fusion (J/g) | T$_m$ (° C.) | T$_c$ (° C.) | T$_{CRYSTAF}$ (° C.) | T$_m$ - T$_{CRYSTAF}$ (° C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 114 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.60° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSP Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSP Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of comparative D shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 flag. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from the Dow Chemical Company), Comparative H* is an elastomeric, substantially linear ethylene/1-octene copolymer (AFFINITY® EG8100, available from The Dow Chemical Company), Comparative I is a substantially linear ethylene/1-octene copolymer (AFFINITY® PL 1840, available from The Dow Chemical Company), Comparative J is a hydrogenated styrene/butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C. while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recover. Thus the exemplified polymers have a unique combination of properties unavailable even in some commercially available, high performance thermoplastic elastomers.

Similarly. Table 4 shows a low (good) storage modulus ratio, G'(25° C.)/G(100° C.), for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast. Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm$^3$) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$^3$ preferably less than about 80 mm$^3$ and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative G. Lower stress relaxation means that the polymer retains its force better in applications such as diapers and other garments where retention of elastic properties over long time periods at body temperatures is desired.

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shutting agent employed in the polymerization.

Extraction of Multi-Block Copolymers

Extraction studies of the polymers of examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

Additional Polymer Examples 19A-J, Continuous Solution Polymerization, Catalyst A1/B2+DEZ For Examples 19A-I Continuous solution polymerizations are carried out in a computer controlled well-mixed reactor. Purified mixed alkanes solvent (Isopar™ E available from Exxon Mobil, Inc.), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

For Example 19J

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

Process details and results are contained in Table 8. Selected polymer properties are provided in Tables 9A-C.

In Table 9B, inventive examples 19F and 19G show low immediate set of around 65-70% strain after 500% elongation.

TABLE 8

Polymerization Conditions

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19A | 55.29 | 32.03 | 323.03 | 101 | 120 | 600 | 0.25 | 200 | 0.42 | 3.0 | 0.70 |
| 19B | 53.95 | 28.96 | 325.3 | 577 | 120 | 600 | 0.25 | 200 | 0.55 | 3.0 | 0.24 |
| 19C | 55.53 | 30.97 | 324.37 | 550 | 120 | 600 | 0.216 | 200 | 0.609 | 3.0 | 0.69 |
| 19D | 54.83 | 30.58 | 326.33 | 60 | 120 | 600 | 0.22 | 200 | 0.63 | 3.0 | 1.39 |
| 19E | 54.95 | 31.73 | 326.75 | 251 | 120 | 600 | 0.21 | 200 | 0.61 | 3.0 | 1.04 |
| 19F | 50.43 | 34.80 | 330.33 | 124 | 120 | 600 | 0.20 | 200 | 0.60 | 3.0 | 0.74 |
| 19G | 50.25 | 33.08 | 325.61 | 188 | 120 | 600 | 0.19 | 200 | 0.59 | 3.0 | 0.54 |
| 19H | 50.15 | 34.87 | 318.17 | 58 | 120 | 600 | 0.21 | 200 | 0.66 | 3.0 | 0.70 |
| 19I | 55.02 | 34.02 | 323.59 | 53 | 120 | 600 | 0.44 | 200 | 0.74 | 3.0 | 1.72 |
| 19J | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | $Zn^4$ in polymer ppm | Poly Rate[5] lb/hr | Conv[6] wt % | Polymer wt % | Eff.[7] |
|---|---|---|---|---|---|---|---|---|---|
| 19A | 4500 | 0.65 | 525 | 0.33 | 248 | 83.94 | 88.0 | 17.28 | 297 |
| 19B | 4500 | 0.63 | 525 | 0.11 | 90 | 80.72 | 88.1 | 17.2 | 295 |
| 19C | 4500 | 0.61 | 525 | 0.33 | 246 | 84.13 | 88.9 | 17.16 | 293 |
| 19D | 4500 | 0.66 | 525 | 0.66 | 491 | 82.56 | 88.1 | 17.07 | 280 |
| 19E | 4500 | 0.64 | 525 | 0.49 | 368 | 84.11 | 88.4 | 17.43 | 288 |
| 19F | 4500 | 0.52 | 525 | 0.35 | 257 | 85.31 | 87.5 | 17.09 | 319 |
| 19G | 4500 | 0.51 | 525 | 0.16 | 194 | 83.72 | 87.5 | 17.34 | 333 |
| 19H | 4500 | 0.52 | 525 | 0.70 | 259 | 83.21 | 88.0 | 17.46 | 312 |
| 19I | 4500 | 0.70 | 525 | 1.65 | 600 | 86.63 | 88.0 | 17.6 | 275 |
| 19J | — | — | — | — | — | — | — | — | — |

[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dimethyl
[4]ppm in final product calculated by mass balance
[5]polymer production rate
[6]weight percent ethylene conversion in reactor
[7]efficiency, kg polymer/g M where g M = g Hf + g Z

TABLE 9A

Polymer Physical Properties

| Ex. | Density (g/cc) | I2 | I10 | I10/I2 | Mw (g/mol) | Mn (g/mol) | Mw/Mn | Heat of Fusion (J/g) | Tm (°C.) | Tc (°C.) | TCRYSTAF (°C.) | Tm – TCRYSTAF (°C.) | CRYSTAF Peak Area (wt %) |
|---|---|---|---|---|---|---|---|---|---|---|---|---|---|
| 19A | 0.8781 | 0.9 | 0.4 | 6.9 | 123700 | 61000 | 2.0 | 56 | 119 | 97 | 46 | 73 | 40 |
| 19B | 0.8749 | 0.9 | 7.3 | 7.8 | 133000 | 44300 | 3.0 | 52 | 122 | 100 | 30 | 92 | 76 |
| 19C | 0.8753 | 5.6 | 38.5 | 6.9 | 81700 | 37300 | 2.2 | 46 | 122 | 100 | 30 | 92 | 8 |
| 19D | 0.8770 | 4.7 | 31.5 | 6.7 | 80700 | 39700 | 2.0 | 52 | 119 | 97 | 48 | 72 | 5 |
| 19E | 0.8750 | 4.9 | 33.5 | 6.8 | 81800 | 41700 | 2.0 | 49 | 121 | 97 | 36 | 84 | 12 |
| 19F | 0.8652 | 1.1 | 7.5 | 6.8 | 124900 | 60700 | 2.1 | 27 | 119 | 88 | 30 | 89 | 89 |
| 19G | 0.8649 | 0.9 | 6.4 | 7.1 | 135000 | 64800 | 2.1 | 26 | 120 | 92 | 30 | 90 | 90 |
| 19H | 0.8654 | 1.0 | 7.0 | 7.1 | 131600 | 66900 | 2.0 | 26 | 118 | 88 | — | — | — |
| 19I | 0.8774 | 11.2 | 75.2 | 6.7 | 66400 | 33700 | 2.0 | 49 | 119 | 99 | 40 | 79 | 13 |
| 19J | 0.8995 | 5.6 | 39.4 | 7.0 | 75500 | 29900 | 2.5 | 101 | 122 | 106 | — | — | — |

TABLE 9B

Polymer Physical Properties of Compression Molded Film

| Example | Density (g/cm³) | Melt Index (g/10 min) | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|---|---|
| 19A | 0.878 | 0.9 | 15 | 63 | 131 | 85 | 79 | 74 |
| 19B | 0.877 | 0.88 | 14 | 49 | 97 | 86 | 84 | 81 |
| 19F | 0.865 | 1 | — | — | 70 | — | 87 | 86 |
| 19G | 0.865 | 0.9 | — | — | 66 | — | — | 87 |
| 19H | 0.865 | 0.92 | — | 39 | — | — | 87 | — |

TABLE 9C

Average Block Index For exemplary polymers[1]

| Example | Zn/C$_2$[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1] Additional information regarding the calculation of the block indices for various polymers is disclosed in U.S. Patent Application Serial No. 11/376,835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety

[2] Zn/C$_2$ * 1000 = (Zn feed flow * Zn concentration/1000000/Mw of Zn)/(Total Ethylene feed flow * (1 − fractional ethylene conversion rate)/Mw of Ethylene) * 1000. Please note that "Zn" in "Zn/C$_2$ * 1000" refers to the amount of zinc in diethyl zinc ("DEZ") used in the polymerization process, and "C2" refers to the amount of ethylene used in the polymerization process.

TABLE 10

Properties and Additives of Examples 20-21

| | Example 20 | | Example 21 | |
|---|---|---|---|---|
| Density (g/cc) | 0.8800 | | 0.8800 | |
| MI | 1.3 | | 1.3 | |
| Additives | DI Water | 100 | DI Water | 75 |
| | Irgafos 168 | 1000 | Irgafos 168 | 1000 |
| | Irganox 1076 | 250 | Irganox 1076 | 250 |
| | Irganox 1010 | 200 | Irganox 1010 | 200 |
| | Chimmasorb 2020 | 100 | Chimmasorb 2020 | 80 |
| Hard segment split (wt %) | 35% | | 35% | |

Examples 20 and 21

The ethylene/α-olefin interpolymer of Examples 20 and 21 were made in a substantially similar manner as Examples 19A-I above with the polymerization conditions shown in Table 11 below. The polymers exhibited the properties shown in Table 10. Table 10 also shows any additives to the polymer.

Irganox 1010 is Tetrakism-methylene(3',5'-di-t-butyl-4-hydroxyhydrocinnamate)methane. Irganox 1076 is Octadecyl-3-(3',5'-di-t-butyl-4'-hydroxyphenyl)propionate. Irgafos 168 is Tris(2.4-di-t-butylphenyl)phosphite. Chimasorb 2020 is 1,6-Hexanediamine, N,N'-bis(2,2,6,6-tetramethyl-4-piperidinyl)-polymer with 2,3,6-trichloro-1,3,5-triazine, reaction products with, N-butyl-1-butanamine and N-butyl-2,2,6-tetramethyl-4-piperidinamine.

TABLE 11

Polymerization Conditions for Examples 20-21

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % |
|---|---|---|---|---|---|---|---|---|---|---|
| 20 | 130.7 | 196.17 | 712.68 | 1767 | 120 | 499.98 | 1.06 | 298.89 | 0.57 | 4.809423 |
| 21 | 132.13 | 199.22 | 708.23 | 1572 | 120 | 462.4 | 1.71 | 298.89 | 0.6 | 4.999847 |

| Ex. | DEZ Flow lb/hr | Cocat 1 Conc. ppm | Cocat 1 Flow lb/hr | Cocat 2 Conc. ppm | Cocat 2 Flow lb/hr | $Zn^4$ in polymer ppm | Poly Rate[5] lb/hr | Conv[6] wt % | Polymer wt % | Eff.[7] |
|---|---|---|---|---|---|---|---|---|---|---|
| 20 | 0.48 | 5634.36 | 1.24 | 402.45 | 0.478 | 131 | 177 | 89.25 | 16.94 | 252.04 |
| 21 | 0.47 | 5706.4 | 1.61 | 289.14 | 1.36 | 129 | 183 | 89.23 | 17.52 | 188.11 |

*Comparative, not an example of the invention
[1] standard $cm^3$/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] ppm Zinc in final product calculated by mass balance
[5] polymer production rate
[6] weight percent ethylene conversion in reactor
[7] efficiency, kg polymer/g M where g M = g Hf + g Z

Example 22

Fibers of Elastic Ethylene/α-Olefin Interpolymer and Random Ethylene Copolymer The elastic ethylene/α-olefin interpolymer of Example 20 was used to make monofilament fibers of 40 denier having an approximately round cross-section. Before the fiber was made the following additives were added to the polymer: 7000 ppm PDMSO(polydimethyl siloxane), 3000 ppm CYANOX 1790 (1,3,5-tris-(4-t-butyl-3-hydroxy-2,6-dimethylbenzyl)-1,3,5-triazine-2,4,6-(1H,3H, 5H)-trione, and 3000 ppm CHIMASORB 944 Poly-[[6-(1,1,3,3-tetramethylbutyl)amino]-s-triazine-2,4-diyl][(2,2,6,6-tetramethyl-4-piperidyl)imino]hexamethylene[(2,2,6,6-tetramethyl-4-piperidyl)imino]] and 0.5% by weight $TiO_2$.

During melt spinning, the resin was filtered using a duplex, continuous melt filter (Kreyenborg GmbH, Model K-SWE-080). The filter screen packs were nominal 25 μm pore filtering. The screen pack consisted of five (5) layers in the following sequence with respect to pore size in which the flow direction was designated from left to right: 590 micron/90 microns/25 microns/multipore non-woven/90 microns/590 microns. The five-layer screen packs were spot-welded together to ensure optimal screen pack alignment. The fibers were then produced using a die profile with circular 0.8 mm diameter, a spin temperature of 299° C., a winder speed of 1000 m/minute, a spin finish of 2%, a cold draw of 6%, and a spool weight of 150 g. The fibers were then crosslinked using 176.4 kGy irradiation as the crosslinking agent while maintaining the temperature of the spool below about 30 C. These fibers are referred to as "OBC1 fiber" below.

A random copolymer having the generic name AFFINITY™ KC8852G (available from The Dow Chemical Company) was used to make monofilament fibers of 40 denier having an approximately round cross-section. AFFINITY™ KC8852G is characterized by having a melt index of 3 g/10 min., a density of 0.875 g/cm³ and similar additives as Example 20. Before the fiber was made the following additives were added to the polymer: 7000 ppm PDMSO(polydimethyl siloxane), 3000 ppm CYANOX 1790 (1,3,5-tris-(4-t-butyl-3-)-hydroxy-2,6-dimethylbenzyl)-1,3,5-triazine-2,4,6-(1H,3H,5H)-trione, and 3000 ppm CHIMASORB 944 Poly-[[6-(1,1,3,3-tetramethylbutyl) amino]-s-triazine-2,4-diyl][2,2,6,6-tetramethyl-4-piperidyl)imino]hexamethylene [(2,2,6,6-tetramethyl-4-piperidyl)imino]], 0.5% by weight $TiO_2$. The fibers were produced using a die profile with circular 0.8 mm diameter, a spin temperature of 299° C., a winder speed of 1000 m/minute, a spin finish of 2%, a cold draw of 6%, and a spool weight of 150 g. The fibers were then crosslinked using 176.4 kGy irradiation as the crosslinking agent while maintaining the temperature of the spool below about 30 C. These fibers are referred to as random or "RAN fiber" below.

Example 23

Wrinkle Free Example

Two different elastic fibers were employed in this example, OBC1 fiber made at a line speed of 650 m/min and RAN fiber made at a winder speed of 450 m/min. These fibers are described in Example 22 above.

Five different yarns labelled as (yarns A-E below) were made with the above fibers using conventional techniques.

Warp: Ne 40 cotton spun yarn Weft:
A: DCY Ne 80/2+40D OBC1, 2.5× draft for OBC1 fiber.
B: DCY Ne 80/2+40D OBC1, 3.0× draft for OBC1 fiber.
C: DCY Ne 80/2+40D OBC1, 3.5× draft for OBC1 fiber.
D,E: SCY Ne40+40D RAN, 4.0× draft for RAN fiber.

DCY stands for "double covered yarn." SCY or CSY stands for "ciro spun yarn"—a different technique.

The five yarns were processed as follows using conventional techniques: Weaving->de-sizing->mercerization->dry cure->heat setting->sanforizing. Further process conditions for each step are described below.

Weaving: The on loom greige construction is 120 ends/in× 70 fills/in for all the items.

de-sizing: De-sizing at 85 C at the speed of 40 m/min.

mercerization: Mercerization at NaOH concentration at 23 Be at the speed of 40 m/min.

dry cure and heat setting: At the 160 C by 50 m/min. Spandex containing fabric can not go through this process. Due to: 1. Acid environment at PH<3, 2. Spandex containing fabric required higher than 180 C heat setting temperature.

Sanforizing: It was done at 120 C.

Wrinkle treatment: Chemical treatment was conducted at 160 C. by 50 m/min.

Fabric Description: Fabric A, B, C: 120 ends/in, 70 fills/in in three color with different OBC1 fiber draft. Fabric D,E:120 ends/in, 70 fills/in in two pattern with 4.0× draft on RAN fiber.

| Fabric | Draft | Color |
|---|---|---|
| A (DCY Ne 80/2 + 40D OBC1, 2.5X draft for OBC1 fiber) | 2.5X | Purple |
| B (DCY Ne 80/2 + 40D OBC1, 3.0X draft for OBC1 fiber) | 3.0X | Brown |
| C (DCY Ne 80/2 + 40D OBC1, 3.5X draft for OBC1 fiber) | 3.5X | Black |
| D (SCY Ne40 + 40D RAN fiber) | 4.0X | White |
| E (4.0X draft for RAN fiber) | 4.0X | White |

Fiber Composition (AATCC 20A-2004)

| | A | B | C | D | E |
|---|---|---|---|---|---|
| Amount of Elastic Polymer | 4.2% OBC1 | 4.6% OBC1 | 3.3% OBC1 | 1.6% RAN | 1.3% RAN |
| Cotton | 95.8% | 95.4% | 96.7% | 98.4% | 98.7% |

Dimensional Change After Laundering

Typical customer requirements are −3%~+3% shrinkage. The fabrics containing RAN and OBC1 performed outstanding dimensional stability by AATCC 135-2004 IVA, 12 minutes machine wash at 120 F normal cycle, follow by tumble dry—cotton sturdy.

| | | A | B | C | D | E |
|---|---|---|---|---|---|---|
| After the 1st wash | Warp wise | −0.1 | 0 | −0.3 | −0.3 | +0.2 |
| | Filling wise | −1.0 | −0.6 | −0.9 | −0.4 | −0.5 |
| After the 3rd wash | Warp wise | −0.7 | −0.4 | −0.8 | −0.4 | +0.2 |
| | Filling wise | −1.0 | −0.5 | −1.2 | −0.3 | −0.1 |

Therefore, after washing the amount of stretch increased without a significant negative affect on growth.

Appearance of Fabric After Laundering

| AATCC 124-2001 IV A (iii) | | | | | |
|---|---|---|---|---|---|
| | A | B | C | D | E |
| After the 1-st wash | SA-4 | SA-4 | SA-4 | SA-4 | SA-4 |
| After the 5-th wash | SA-3.1 | SA-3.2 | SA-3.6 | SA-3.1 | SA-3.3 |

Tearing Strength

| Typical customer minimum requirement is 1.5 LBs in both directions. ASTM D1424-1996 | | | | | | |
|---|---|---|---|---|---|---|
| LBS | | A | B | C | D | E |
| Tearing Strength (lb) | Warp | 2.5 | 2.6 | 2.5 | 3.2 | 2.7 |
| | Filling | 1.9 | 2.3 | 2.2 | 1.6 | 1.8 |

Stretch Properties of Fabrics

Typical customer requirements are minimum stretch ratio is 15% and growth ratio must lower than 8%.

| ASTM D3107-1980 | | | | | | | |
|---|---|---|---|---|---|---|---|
| % | | | A | B | C | D | E |
| @4 lb load-4TH | Stretch | | 19.0 | 22.3 | 22.0 | 18.3 | 17.5 |
| | Growth | | 4.2 | 5.7 | 5.0 | 3.5 | 3.8 |
| 85% Stretch @4 lb load | Growth | 30 sec | 10.7 | 6.7 | 8.7 | 6.0 | 6.7 |
| | | 30 min | 6.6 | 4.0 | 5.0 | 3.6 | 4.0 |

As seen from the data provided in the tables above, the fabrics comprising the OBC1 ethylene o-olefin interpolymer provide stretch fabric capable of undergoing wrinkle free treatment, including excellent dimensional stability and stretch properties.

Example 24

Varying Amounts of Fiber Crosslinking

The elastic ethylene/α-olefin interpolymer of Example 20 was used to make monofilament fibers of 40 denier having an approximately round cross-section. Before the fiber was made the following additives were added to the polymer: 7000 ppm PDMSO(polydimethyl siloxane), 3000 ppm CYANOX 1790 (1,3,5-tris-(4-t-butyl-3-hydroxy-2,6-dimethylbenzyl)-1,3,5-triazine-2,4,6-(1H,3H, 5H)-trione, and 3000 ppm CHIMASORB 944 Poly-[6-(1,1,3,3-tetramethylbutyl)amino-s-triazine-2,4-diyl][2,2,6,6-tetramethyl-4-piperidyl)imino hexamethylene[(2,2,6,6-tetramethyl-4-piperidyl)imino]] and 0.5% by weight $TiO_2$. The fibers were produced using a die profile with circular 0.8 mm diameter, a spin temperature of 299° C., a winder speed of 650 m/minute, a spin finish of 2%, a cold draw of 6%, and a spool weight of 150 g. Fibers were then crosslinked using varying amounts of irradiation from an e-beam as the crosslinking agent.

Figure 8:
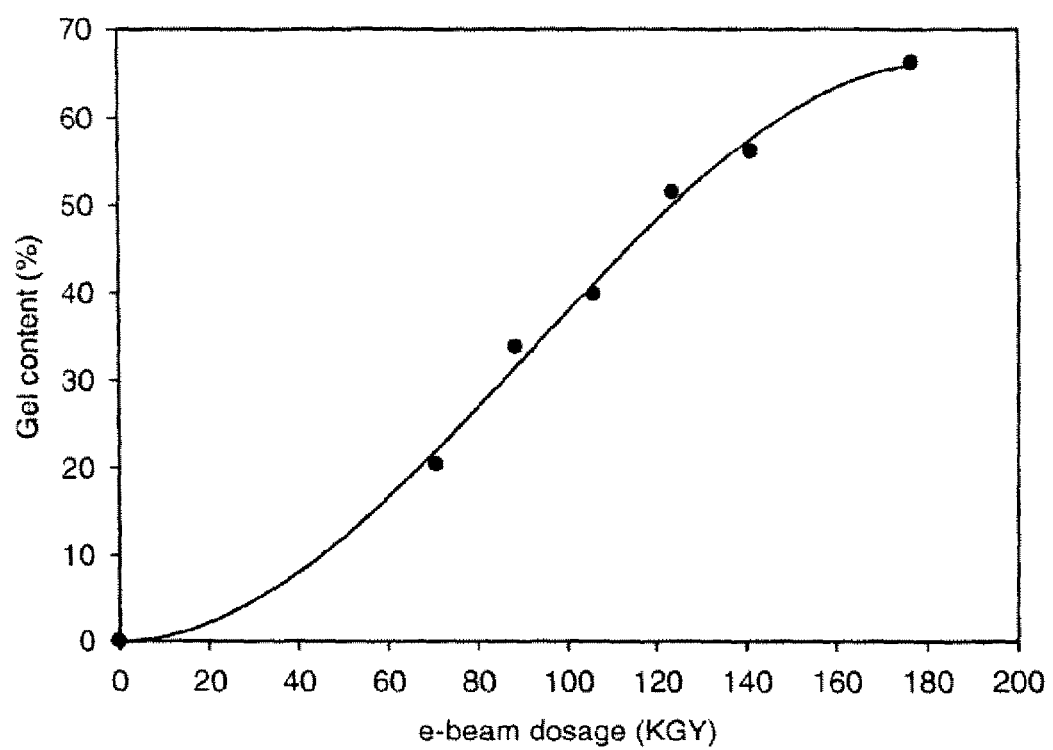
FIG. 8 shows a plot of e-beam radiation versus percent crosslinking for an olefin block copolymer.

The gel content versus the amount of irradiation is shown in FIG. 8. The gel content was determined by weighing out an approximately 25 mg fiber sample to 4 significant figure accuracy. The sample is then combined with 7 ml xylene in a capped 2-dram vial. The vial is heated 90 minutes at 125° C. to 135° C., with inversion mixing (i.e. turning vial upside down) every 15 minutes, to extract essentially all the non-crosslinked polymer. Once the vial has cooled to approximately 25° C., the xylene is decanted from the gel. The gel is rinsed in the vial with a small portion of fresh xylenes. The rinsed gel is transferred to a tared aluminum weighing pan. The tared dish with gel is vacuum dried at 125° C. for 30 minutes to remove the xylene by evaporation. The pan with dried gel is weighed on an analytical balance. The gel content is calculated based on the extracted gel weight and original fiber weight. FIG. 8 shows that as the e-beam dosage increases the amount of crosslinking (gel content) increases. One skilled in the art will appreciate that the precise relationship between the amount of crosslinking and e-beam dosage may be affected by a given polymer's properties e.g., molecular weight or melt index.

Example 25

Shirting Weight Fabrics

Shirting weight fabric was produced using the following:

Warp yarns-2×1 twisted, ring spun 100% Cotton yarn, count Ne 60/2.

Weft yarns: weft yarns were dyed in cones prior to weaving. Composite core spun yarn made of cotton and OBC resin based fibers made in a similar manner as OBC1 except that a spin temperature of 295° C. was employed and the fibers were crosslinked using 117.6 key irradiation as the crosslinking agent while maintaining the temperature of the spool below about 30 C. The fibers were about 40 denier in count, total yarn count Ne 30/1. Draft applied to OBC elastic core was 3.3×.

Plain weave fabric structure: On loom density accounting for 28.7 ends/cm and 31 picks/cm, total reed width 175 cm, total number or ends in the warp 5022.

The above fabric was processed through a finishing routine as follows:

| Singeing + desizing: | process speed 90 m/min approx 60° C. fabric temperature |
| Scouring (7 tanks) | process speed 50 m/min equipment made of 7 individual washing tanks washing liquor temperature set at 70° C.-75° C.-80° C.-85° C.-90° C.-90° C.-90° C. (respectively for each tank) |
| Bleaching | Pad batch process Room temp 20 hour batching |
| Scouring (6 tanks) | process speed 50 m/min, equipment made of 7 individual washing tanks washing liquor temperature set at 90° C.-95° C.-95° C.-95° C.-80° C.-60° C. |
| Mercerizing | process speed 50 m/min temperature 60° C. |
| Washing | 95° C.-95° C.-80° C.-80° C. |
| Tenter frame | process speed 40 m/min, temperature 100° C. |
| Finish + tenter frame | process speed 50 m/min, 120° C. |
| Sanforizing | |

Finishing and tenter step include the following specific wrinkle resistance treatment: MXL® continuous moist cross linking process from Monforts as described at, for example, www.Monforts.de which process comprises padding, drying at approximately 110 C. and 30-35% steam and 5-6% residual moisture for approximately 3 minutes, washing, and top finish final treatment (calendaring and shrinking). The above described fabric, after the indicated finishing process, exhibited the following properties:

| Property | Testing Method | Result |
|---|---|---|
| Weight (g/m2): | | 156 |
| Tear strength Weft [g] | Marks & Spencer, P29 dated July 1994 | 761 |

-continued

| Property | Testing Method | Result |
|---|---|---|
| Tear strength Warp [g] | Marks & Spencer, P29 dated July 1994 | 1522 |
| Tensile strength Weft [N] | Marks & Spencer, P11 dated July 1994 | 27 |
| Tensile strength Warp [N] | Marks & Spencer, P11 dated July 1994 | 59 |
| Elongation [%] | Dupont TTM 075 | 24.9 |
| Growth [%] | Dupont TTM 077 | 5.8 |
| Dimensional stability: fabric width [cm] | machine wash at 40° C. + line dry | 129.3 |
| Dimensional stability: Warp shrinkage [%] | machine wash at 40° C. + line dry | −0.8 |
| Dimensional stability: Weft shrinkage [%] | machine wash at 40° C. + line dry | −0.5 |
| Wrinkle recovery properties: DP rate | Marks & Spencer, P134 dated September 2004 | 3.5 |
| Wrinkle recovery properties: crease recovery angle [dge] | Marks & Spencer, P22 | 232 |

The Marks and Spencer and Dupont tests described above in the table are incorporated herein by reference. The summaries of the methods below are not intended to substitute for the actual method.

Marks & Spencer, Method of test P29, Tear strength: Method of assessing fabric tear strength using Elmendorf pendulum tear strength tester, with maximum force exerted of 1631 g. Five (5) fabric specimens of 80 mm×58 mm, previously conditioned are prepared and tested in standard atmosphere. Tear propagates from an initial cut in the fabric of 15 mm in length; the swinging action of the pendulum, due to its weight and height, tears the fabric, and tearing strength is assessed as a function of the energy loss by the pendulum due to tearing action. The 58 mm dimension of the specimen is: in the fabric warp direction for weft tear strength; the tear is across the weft threads; in the fabric weft direction for warp tear strength; the tear is across the warp threads. The average of 5 results is reported in grams.

Marks & Spencer, Method of test P11, Tensile strength: Method of assessing fabric tensile strength using a constant rate of traverse tensile testing instrument, with traverse rate set at 100 mm/min, 200 mm gauge length. Three strips 300 mm long in the direction of the test (warp or weft), frayed down to 50 mm wide are tested, to measure the load required to break the specimen, and an average of 3 results is reported.

DuPont method of test TTM075, Fabric Elongation (Spring balance test). The test determines the total stretch (elongation) of a woven fabric. Fabric specimens of known length are exercised and the subjected to load of 6 N per cm (3.37 ld per in.). The elongations at these loads are recorded and fabric elongation is calculated. Fabric specimens of 33 cm×6 cm are cut from the fabric to be tested; the long dimension should correspond to the stretch direction. Specimens are raveled to 5 cm in width, than conditioned. Two benchmarks exactly 25 cm apart are drawn. Specimens are mounted on the spring balance apparatus, exerted 3 times with 30 N load applied for 3 seconds, then kept extended under a load of 30 N. The length of extended specimen is compared to the original length to calculate the elongation [%]. Individual measurements and average are reported.

DuPont, method of test TTM077, Fabric Growth This test determines the percentage of fabric growth in stretch wovens. Fabrics first undergo an elongation test to determine the fabric elongation. Specimens from these fabrics are then extended to 80% of the fabric elongation and held in this state for 30 minutes. They are then allowed to relax for 60 minutes, at which point the fabric growth is measured and calculated. Three specimens are cut for each fabric sample. Each specimen should measure 55×6 cm and ravel to 5 cm in width. The long dimension should correspond with the stretch direction. Benchmarks are drawn on each specimen exactly 50 cm apart. Specimens are extended to 80% of maximum elongation, kept extended 30 min and measured after 60 min relaxation. To calculate the growth: X % Growth (L/50 cm)×100 (where L is increase in length between the specimen after relaxation.). The average growth for the three specimens is reported.

Marks & Spencer, Method of test P134, Assessment of non-iron products: To assess performance of fabrics promoted as non-iron quality. Fabric specimens of 500 mm×500 mm size are cut from the fabric, washed at 60° C. and tumble dried. Fabric appearance is than rated against standard replicas (AATCC 143).

Example 26

Shirting Weight Fabric

Shirting weight fabric was produced using the following:

Warp yarns: Ring spun 100% Cotton yarn, count Ne 50/1.

Weft yarns: Composite core spun yarn made of cotton and OBC resin based fibers of Example 25 above were 40 denier in count with a total yarn count Ne 50/1.

Plain weave fabric structure: On loom density accounting for 48 ends/cm and 30 picks/cm, total reed width 175 cm, total number or ends in the warp 8435.

Such fabric was processed through a finishing routine as follows:

| | |
|---|---|
| Singeing + desizing: | process speed 90 m/min |
| | approx 60° C. fabric temperature |
| Scouring (7 tanks) | process speed 50 m/min |
| | equipment made of 7 individual washing tanks |
| | washing liquor temperature set at |
| | 70° C.-75° C.-80° C.-85° C.-90° C.- |
| | 90° C.-90° C. (respectively for each tank) |
| Bleaching | Pad batch process |
| | Room temp |
| | 20 hour batching |
| Scouring (6 tanks) | process speed 50 m/min, |
| | equipment made of 7 individual washing tanks |
| | washing liquor temperature set at 90° C.-95° C.- |
| | 95° C.-95° C.-80° C.-60° C. |
| Mercerizing | process speed 50 m/min |
| | temperature 60° C. |
| Washing | 95° C.-95° C.-80° C.-80° C. |
| Tenter frame | process speed 40 m/min, |
| | temperature 100° C. |
| Finish + tenter frame | process speed 50 m/min, |
| | 120° C. |
| Sanforizing | |

Finishing and tenter step include the following specific wrinkle resistance treatment: MXL® continuous moist cross linking process from Monforts as described at, for example, www.Monforts.de which process comprises padding, drying at approximately 110 C and 30-35% steam and 5-6% residual moisture for approximately 3 minutes, washing, and top finish final treatment (calendaring and shrinking). The above described fabric, after the indicated finishing process, exhibited the following properties:

| Property | Testing Method | Result |
|---|---|---|
| Weight (g/m2): | | 113 |
| Tear strength Weft [g] | Marks & Spencer P29 dated July 1994 | 587 |
| Tear strength Warp [g] | Marks & Spencer P29 dated July 1994 | 1000 |
| Tensile strength Weft [N] | Marks & Spencer P11 dated July 1994 | 14 |
| Tensile strength Warp [N] | Marks & Spencer P11 dated July 1994 | 57 |
| Elongation [%] | Dupont TTM 075 | 12 |
| Growth [%] | Dupont TTM 077 | 4.2 |
| Dimensional stability: fabric width [cm] | machine wash at 40° C. + line dry | 138.9 |
| Dimensional stability: Warp shrinkage [%] | machine wash at 40° C. + line dry | −1 |
| Dimensional stability: Weft shrinkage [%] | machine wash at 40° C. + line dry | −0.5 |
| Wrinkle recovery properties: DP rate | Marks & Spencer P134 dated September 2004 | 3.1 |
| Wrinkle recovery properties: crease recovery angle [dge] | Marks & Spencer P22 | 236 |

Example 27

Shirting Weight Fabric

Shirting weight fabric was produced using the following:

Warp yarns: Ring spun 100% Cotton yarn, count Ne 50/1

Weft yarns: weft yarns were dyed in cones prior to weaving. Composite core spun yarn made of cotton and OBC resin based fibers of Example 25 40 denier in count, and a total yarn count Ne 50/1.

Plain weave fabric structure: On loom density accounting for 48 ends/cm and 30 picks/cm, total reed width 175 cm, total number or ends in the warp 8435 (same as per example 26).

The fabric was processed through a finishing routine as follows:

| | |
|---|---|
| Singeing + desizing: | process speed 90 m/min |
| | approx 60° C. fabric temperature |
| Scouring (7 tanks) | process speed 50 m/min |
| | equipment made of 7 individual washing tanks |
| | washing liquor temperature set at |
| | 70° C.-75° C.-80° C.-85° C.-90° C.- |
| | 90° C.-90° C. (respectively for each tank) |
| Bleaching | Pad batch process |
| | Room temp |
| | 20 hour batching |
| Scouring (6 tanks) | process speed 50 m/min, |
| | equipment made of 7 individual washing tanks |
| | washing liquor temperature set at 90° C.-95° C.- |
| | 95° C.-95° C.-80° C.-60° C. |
| Mercerizing | process speed 50 m/min |
| | temperature 60° C. |
| Washing | 95° C.-95° C.-80° C.-80° C. |
| Tenter frame | process speed 40 m/min, |
| | temperature 100° C. |
| Finish + tenter frame | process speed 50 m/min, |
| | 120° C. |
| Sanforizing | |

Finishing and tenter step include the following specific wrinkle resistance treatment: MXL® continuous moist cross linking process from Monforts as described at, for example, www.Monforts.de which process comprises padding, drying at approximately 110 C and 30-35% steam and 5-6% residual moisture for approximately 3 minutes, washing, and top finish final treatment (calendaring and shrinking). The above described fabric, after the indicated finishing process, exhibited the following properties:

| Property | Testing Method | Result |
|---|---|---|
| Weight (g/m2): | | 111 |
| Tear strength Weft [g] | Marks & Spencer P29 dated July 1994 | 543 |
| Tear strength Warp [g] | Marks & Spencer P29 dated July 1994 | 1156 |
| Tensile strength Weft [N] | Marks & Spencer P11 dated July 1994 | 15 |
| Tensile strength Warp [N] | Marks & Spencer P11 dated July 1994 | 55 |
| Elongation [%] | Dupont TTM 075 | 13.6 |
| Growth [%] | Dupont TTM 077 | 2.3 |
| Dimensional stability: fabric width [cm] | Cmachine wash at 40° C. + line dry | 145.7 |
| Dimensional stability: Warp shrinkage [%] | machine wash at 40° C. + line dry | −0.5 |
| Dimensional stability: Weft shrinkage [%] | machine wash at 40° C. + line dry | −0.5 |
| Wrinkle recovery properties: DP rate | Marks & Spencer P134 dated September 2004 | 3 |
| Wrinkle recovery properties: crease recovery angle [dge] | Marks & Spencer P22 | 259.5 |

Example 28

Shirting Weight Fabric

Shirting weight fabric was produced using the following:

Warp yarns: Ring spun 100% Cotton yarn, count Ne 50/1.

Weft yarns: (inserted in alternating picks) (1) Composite core spun yarn made of cotton and OBC resin based fibers of Example 25 40 denier in count and a total yarn count Ne 50/1 and (2) Ring spun 100% Cotton yarn, count Ne 50/1.

Plain weave fabric structure: On loom density accounting for 48 ends/cm and 30 picks/cm, total reed width 175 cm, total number or ends in the warp 8435.

Such fabric was processed through a finishing routine as follows:

| | |
|---|---|
| Singeing + desizing: | process speed 90 m/min approx 60° C. fabric temperature |
| Scouring (7 tanks) | process speed 50 m/min equipment made of 7 individual washing tanks washing liquor temperature set at 70° C.-75° C.-80° C.-85° C.-90° C.-90° C.-90° C. (respectively for each tank) |
| Bleaching | Pad batch process Room temp 20 hour batching |
| Scouring (6 tanks) | process speed 50 m/min, equipment made of 7 individual washing tanks washing liquor temperature set at 90° C.-95° C.-95° C.-95° C.-80° C.-60° C. |
| Mercerizing | process speed 50 m/min temperature 60° C. |
| Washing | 95° C.-95° C.-80° C.-80° C. |
| Tenter frame | process speed 40 m/min, temperature 100° C. |
| Finish + tenter frame | process speed 50 m/min, 120° C. |
| Sanforizing | |

Finishing and tenter step include the following specific wrinkle resistance treatment MXL® continuous moist cross linking process from Monforts as described at, for example, www.Monforts.de which process comprises padding, drying at approximately 110 C and 30-35% steam and 5-6% residual moisture for approximately 3 minutes washing, and top finish final treatment (calendaring and shrinking). The above described fabric, after the indicated finishing process, exhibited the following properties:

| Property | Testing Method | Result |
|---|---|---|
| Weight (g/m2): | | 113 |
| Tear strength Weft [g] | Marks & Spencer P29 dated July 1994 | 608 |
| Tear strength Warp [g] | Marks & Spencer P29 dated July 1994 | 1283 |
| Tensile strength Weft [N] | Marks & Spencer P11 dated July 1994 | 14 |
| Tensile strength Warp [N] | Marks & Spencer P11 dated July 1994 | 53 |
| Elongation [%] | Dupont TTM 075 | 14.9 |
| Growth [%] | Dupont TTM 077 | 3.5 |
| Dimensional stability: fabric width [cm] | machine wash at 40° C. + line dry | 143.8 |
| Dimensional stability: Warp shrinkage [%] | machine wash at 40° C. + line dry | −0.8 |
| Dimensional stability: Weft shrinkage [%] | machine wash at 40° C. + line dry | −0.5 |
| Wrinkle recovery properties: DP rate | Marks & Spencer P134 dated September 2004 | 3.4 |
| Wrinkle recovery properties: crease recovery angle [dge] | Marks & Spencer P22 | 247 |

Example 29

Shirting Weight Fabric

Shining weight fabric was produced using the following:

Warp yarns: Ring spun 100% Cotton yarn, count Ne 50/1.

Weft yarns: well yarns were dyed in cones prior to weaving (inserted in alternating picks) (1) Composite core spun yarn made of cotton and OBC resin based fibers of Example 25 40 denier in count and total yarn count Ne 50/1 and (2) Ring spun 100% Cotton yarn, count Ne 50/1.

Plain weave fabric structure: On loom density accounting for 48 ends/cm and 30 picks/cm, total reed width 175 cm, total number or ends in the warp 8435 (same as per example 28).

Such fabric was processed through a finishing routine as follows:

| | |
|---|---|
| Singeing + desizing: | process speed 90 m/min approx 60° C. fabric temperature |
| Scouring (7 tanks) | process speed 50 m/min equipment made of 7 individual washing tanks washing liquor temperature set at 70° C.-75° C.-80° C.-85° C.-90° C.-90° C.-90° C. (respectively for each tank) |
| Bleaching | Pad batch process Room temp 20 hour batching |
| Scouring (6 tanks) | process speed 50 m/min, equipment made of 7 individual washing tanks washing liquor temperature set at 90° C.-95° C.-95° C.-95° C.-80° C.-60° C. |

| | | |
|---|---|---|
| Mercerizing | process speed 50 m/min temperature 60° C. | |
| Washing | 95° C.-95° C.-80° C.-80° C. | |
| Tenter frame | process speed 40 m/min, temperature 100° C. | |
| Finish + tenter frame | process speed 50 m/min, 120° C. | |
| Sanforizing | | |

Finishing and tenter step include the following specific wrinkle resistance treatment: MXL® continuous moist cross linking process from Monforts as described at, for example, www.Monforts.de which process comprises padding, drying at approximately 110 C and 30-35% steam and 5-6% residual moisture for approximately 3 minutes, washing, and top finish final treatment (calendaring and shrinking). The above described fabric, after the indicated finishing process, exhibited the following properties:

| Property | Testing Method | Result |
|---|---|---|
| Weight (g/m2): | | 111 |
| Tear strength Weft [g] | Marks & Spencer P29 dated July 1994 | 521 |
| Tear strength Warp [g] | Marks & Spencer P29 dated July 1994 | 978 |
| Tensile strength Weft [N] | Marks & Spencer P11 dated July 1994 | 16 |
| Tensile strength Warp [N] | Marks & Spencer P11 dated July 1994 | 53 |
| Elongation [%] | Dupont TTM 075 | 16 |
| Growth [%] | Dupont TTM 077 | 2.7 |
| Dimensional stability: fabric width [cm] | machine wash at 40° C. + line dry | 147.3 |
| Dimensional stability: Warp shrinkage [%] | machine wash at 40° C. + line dry | −0.8 |
| Dimensional stability: Weft shrinkage [%] | machine wash at 40° C. + line dry | −0.5 |
| Wrinkle recovery properties: DP rate | Marks & Spencer P134 dated September 2004 | 3.1 |
| Wrinkle recovery properties: crease recovery angle [deg] | Marks & Spencer P22 | 257 |

Example 30

Shirting Weight Fabric

Shining weight fabric was produced using the following:
Warp yarns: Ring spun 100% Cotton yarn count Ne 40/1.
Weft yarns: Composite core spun yarn made of cotton and OBC resin based fibers of Example 25 of 40 denier in count and total yarn count Ne 40/1.
Plain weave fabric structure: On loom density accounting for 50 ends/cm and 24 picks/cm, total reed width 170 cm, total number of ends in the warp 8501.
Such fabric was processed through a finishing routine as follows:

| | |
|---|---|
| Singeing + desizing: | process speed 90 m/min approx 60° C. fabric temperature |
| Scouring (7 tanks) | process speed 50 m/min equipment made of 7 individual washing tanks washing liquor temperature set at 70° C.-75° C.-80° C.-85° C.-90° C.-90° C.-90° C. (respectively for each tank) |
| Bleaching | Pad batch process Room temp 20 hour batching |
| Scouring (6 tanks) | process speed 50 m/min, equipment made of 7 individual washing tanks washing liquor temperature set at 90° C.-95° C.-95° C.-95° C.-80° C.-60° C. |
| Mercerizing | process speed 50 m/min temperature 60° C. |
| Washing | 95° C.-95° C.-80° C.-80° C. |
| Tenter frame | process speed 40 m/min, temperature 100° C. |
| Finish + tenter frame | process speed 50 m/min, 120° C. |
| Sanforizing | |

Finishing and tenter step include the following specific wrinkle resistance treatment: MXL® continuous moist cross linking process from Monforts as described at, for example, www.Monforts.de which process comprises padding, drying at approximately 110 C and 30-35% steam and 5-6% residual moisture for approximately 3 minutes, washing, and top finish final treatment (calendaring and shrinking). The above described fabric, after the indicated finishing process, exhibited the following properties:

| Property | Testing Method | Result |
|---|---|---|
| Weight (g/m2): | | 132 |
| Tear strength Weft [g] | Marks & Spencer P29 dated July 1994 | 761 |
| Tear strength Warp [g] | Marks & Spencer P29 dated July 1994 | 1326 |
| Tensile strength Weft [N] | Marks & Spencer P11 dated July 1994 | 14 |
| Tenslie strength Warp [N] | Marks & Spencer P11 dated July 1994 | 68 |
| Elongation [%] | Dupont TTM 075 | 12.6 |
| Growth [%] | Dupont TTM 077 | 4.2 |
| Dimensional stability: fabric width [cm] | machine wash at 40° C. + line dry | 145.7 |
| Dimensional stability: Warp shrinkage [%] | machine wash at 40° C. + line dry | −1 |
| Dimensional stability: Weft shrinkage [%] | machine wash at 40° C. + line dry | −0.5 |
| Wrinkle recovery properties: DP rate | Marks & Spencer P134 dated September 2004 | 3.1 |
| Wrinkle recovery properties: crease recovery angle [deg] | Marks & Spencer P22 | 220 |

Example 31

Shirting Weight Fabric

Shirting weight fabric was produced using the following:

Warp yarns: Ring spun 100% Cotton yarn count Ne 40/1

Weft yarns: weft yarns were dyed in cones prior to weaving. Composite core spun yarn made of cotton and OBC resin based fibers of Example 25 of 40 denier in count and total yarn count Ne 40/1.

Plain weave fabric structure: On loom density accounting for 50 ends/cm and 24 picks/cm, total reed width 170 cm, total number of ends in the warp 8501.

Such fabric was processed through a finishing routine as follows:

| | |
|---|---|
| Singeing + desizing: | process speed 90 m/min |
| | approx 60° C. fabric temperature |
| Scouring (7 tanks) | process speed 50 m/min |
| | equipment made of 7 individual washing tanks |
| | washing liquor temperature set at |
| | 70° C.-75° C.-80° C.-85° C.-90° C.- |
| | 90° C.-90° C. (respectively for each tank) |
| Bleaching | Pad batch process |
| | Room temp |
| | 20 hour batching |
| Scouring (6 tanks) | process speed 50 m/min, |
| | equipment made of 7 individual washing tanks |
| | washing liquor temperature set at 90° C.-95° C.- |
| | 95° C.-95° C.-80° C.-60° C. |
| Mercerizing | process speed 50 m/min |
| | temperature 60° C. |
| Washing | 95° C.-95° C.-80° C.-80° C. |
| Tenter frame | process speed 40 m/min, |
| | temperature 100° C. |
| Finish + tenter frame | process speed 50 m/min, |
| | 120° C. |
| Sanforizing | |

Finishing and tenter step include the following specific wrinkle resistance treatment: MXL® continuous moist cross linking process from Monforts as described at, for example, www.Monforts.de which process comprises padding, drying at approximately 110 C and 30-35% steam and 5-6% residual moisture for approximately 3 minutes, washing and top finish final treatment (calendaring and shrinking). The above described fabric, after the indicated finishing process, exhibited the following properties:

| Property | Testing Method | Result |
|---|---|---|
| Weight (g/m2): | | 130 |
| Tear strength Weft [g] | Marks & Spencer P29 dated July 1994 | 565 |
| Tear strength Warp [g] | Marks & Spencer P29 dated July 1994 | 1174 |
| Tensile strength Weft [N] | Marks & Spencer P11 dated July 1994 | 14 |
| Tensile strength Warp [N] | Marks & Spencer P11 dated July 1994 | 64 |
| Elongation [%] | Dupont TTM 075 | 9.2 |
| Growth [%] | Dupont TTM 077 | 2.8 |
| Dimensional stability: fabric width [cm] | machine wash at 40° C. + line dry | 150 |
| Dimensional stability: Warp shrinkage [%] | machine wash at 40° C. + line dry | −0.8 |
| Dimensional stability: Weft shrinkage [%] | machine wash at 40° C. + line dry | −0.5 |
| Wrinkle recovery properties: DP rate | Marks & Spencer P134 dated September 2004 | 3.0 |
| Wrinkle recovery properties: crease recovery angle [deg] | Marks & Spencer P22 | 242 |

We claim:

1. A stretch fabric comprising:
(A) an ethylene/α-olefin block interpolymer, wherein the ethylene/α-olefin interpolymer before crosslinking is characterized by one or more of the following characteristics:
  (1) an average block index greater than zero and up to about 1.0 and a molecular weight distribution, $M_w/M_n$, greater than about 1.3; or
  (2) at least one molecular fraction which elutes between 40° C. and 130° C. when fractionated using TREF, characterized in that the fraction has a block index of at least 0.5 and up to about 1; or
  (3) an $M_w/M_n$ from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2;\text{ or}$$

(4) an $M_w/M_n$ from about 1.7 to about 3.5, and a heat of fusion, ΔH in J/g, and a delta quantity ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48°\text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or
  (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:
  Re>1481−1629(d); or
  (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index density, and molar comonomer content (based on the whole polymer) within 10 percent of that of the ethylene/α-olefin interpolymer; or
(2) a storage modulus at 25° C., G'(25° C.), and a storage modulus at 100° C., G'(100° C.), wherein the ratio of G(25° C.) to G'(100° C.) is in the range of about 1:1 to about 9:1; and
(B) a crosslinked cellulosic material;
  wherein the fabric has a stretch of at least 8 percent measured according to ASTM D3107, and wherein the fabric has a durable press rating of at least 3.0 after 5 times washing using AATCC-124 or Marks and Spencer P134.

2. The fabric of claim 1 wherein the cellulosic material is selected from the group consisting of cotton, flax, ramie, rayon, viscose, hemp, wool, silk, linen, bamboo, tencel, and mixtures thereof.

3. The fabric of claim 1 wherein the cellulosic material comprises 60 to 97 percent by weight of the fabric.

4. The fabric of claim 3 wherein the cellulosic material comprises at least 90 percent by weight of the fabric.

5. The fabric of claim 3 wherein the cellulosic material comprises cotton.

6. The fabric of claim 1 wherein the ethylene/α-olefin interpolymer comprises 2 percent to 10 percent by weight of the fabric.

7. The fabric of claim 1 wherein the fabric tear strength is at least 1.5 pounds as measured according to ASTM P1424 or at least 1.1 pounds as measured by Marks and Spencer P11.

8. The fabric of claim 1 wherein the ethylene/α-olefin interpolymer is characterized by a density of from about 0.865 to about 0.92 g/cm³ (ASTM D 792) and a melt index of from about 0.1 to about 10 g/10 minutes before any crosslinking.

9. The fabric of claim 1 wherein the ethylene/α-olefin interpolymer is in the form of one or more fibers comprising the reaction product of ethylene/α-olefin interpolymer and at least one crosslinking agent and wherein said fiber has a denier of from about 1 denier to about 180 denier.

10. The fabric of claim 1 wherein the ethylene/α-olefin interpolymer is in the form of one or more fibers comprising the reaction product of ethylene/α-olefin interpolymer and at least one crosslinking agent and wherein said one or more fibers comprise from about 1 to about 30% by weight of the fabric.

11. The fabric of claim 10 wherein the fabric is a knit fabric.

12. The fabric of claim 1 wherein the ethylene/α-olefin interpolymer is in the form of one or more fibers comprising the reaction product of ethylene/α-olefin interpolymer and at least one crosslinking agent and wherein said one or more fibers comprise from about 1 to about 10% by weight of the fabric.

13. The fabric of claim 12 wherein the fabric is a woven fabric.

14. The fabric of claim 1 wherein the ethylene/α-olefin interpolymer is in the form of one or more fibers comprising the reaction product of ethylene/α-olefin interpolymer and at least one crosslinking agent wherein said one or more fibers comprise a gel content of at least about 10% by weight.

15. The fabric of claim 1 wherein the fabric can be stretched in two dimensions.

16. The fabric of claim 1 wherein the fabric comprises permanent bonds rendering it relatively wrinkle-free.

17. The fabric of claim 1 wherein the fabric retains its dimensional stability after wrinkle free treatment.

18. A stretch fabric comprising:

(A) an ethylene/α-olefin block interpolymer, wherein the ethylene/α-olefin interpolymer before crosslinking is characterized by one or more of the following characteristics:

(1) an average block index greater than zero and up to about 1.0 and a molecular weight distribution, $M_w/M_n$, greater than about 1.3; or (2) at least one molecular fraction which elutes between 40° C. and 130° C. when fractionated using TREF, characterized in that the fraction has a block index of at least 0.5 and up to about 1; or (3) an $M_w/M_n$ from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{ or}$$

(4) an $M_w/M_n$ from about 1.7 to about 3.5, and a heat of fusion, ΔH in J/g, and a delta quantity ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase: Re>1481−1629(d); or (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index density, and molar comonomer content (based on the whole polymer) within 10 percent of that of the ethylene/α-olefin interpolymer; or (2) a storage modulus at 25° C., G'(25° C.), and a storage modulus at 100° C., G'(100° C.), wherein the ratio of G(25° C.) to G'(100° C.) is in the range of about 1:1 to about 9:1; and (B) a crosslinked animal fiber;

wherein the fabric has a stretch of at least 8 percent measured according to ASTM D3107, and wherein the fabric has a durable press rating of at least 3.0 after 5 times washing using AATCC-124 or Marks and Spencer P134.

19. The fabric of claim 18 wherein the ethylene α-olefin interpolymer is in the form of one or more fibers comprising the reaction product of ethylene/α-olefin interpolymer and at least one crosslinking agent, wherein the animal fiber comprises keratin, and wherein said fabric has been rendered washable and wrinkle-free without ironing.

20. The fabric of claim 1, wherein the fabric is such that any creases formed in the fabric will be substantially retained after washing.

21. A garment comprising the fabric of claim 1.

22. The garment of claim 21 wherein the garment has a crease retention rating of at least 3.0 after 5 times washing using AATCC-143-1996.

23. The fabric of claim 1 wherein the ratio of percent growth to percent stretch is from about 0.05 to about 0.5.

24. The fabric of claim 1 which comprises elastic fibers comprised of a polymer selected from the group consisting of polybutylene terephthalate, spandex, poly ethylene terephthalate), polytrimethylene terephthalate), and mixtures thereof.

25. The fabric of claim 18 wherein the animal fiber comprises keratin and wherein said fabric has been rendered washable and wrinkle-free without ironing.

* * * * *